(12) United States Patent
Kato et al.

(10) Patent No.: US 8,115,830 B2
(45) Date of Patent: Feb. 14, 2012

(54) IMAGE PROCESSING APPARATUS

(75) Inventors: Yutaka Kato, Fukuchiyama (JP); Yutaka Kiuchi, Ayabe (JP)

(73) Assignee: Omron Corporation, Kyoto (JP)

( * ) Notice: Subject to any disclaimer, the term of this patent is extended or adjusted under 35 U.S.C. 154(b) by 470 days.

(21) Appl. No.: 12/260,435

(22) Filed: Oct. 29, 2008

(65) Prior Publication Data

US 2009/0174795 A1 Jul. 9, 2009

(30) Foreign Application Priority Data

Oct. 31, 2007 (JP) ................................ P2007-284130

(51) Int. Cl.
*H04N 9/68* (2006.01)
(52) U.S. Cl. ....................................................... 348/234
(58) Field of Classification Search ................... 348/234
See application file for complete search history.

(56) References Cited

U.S. PATENT DOCUMENTS

| | | | |
|---|---|---|---|
| 6,539,054 B1* | 3/2003 | Matsui et al. | 375/240.08 |
| 6,650,774 B1* | 11/2003 | Szeliski | 382/169 |
| 6,687,400 B1* | 2/2004 | Szeliski | 382/168 |
| 6,757,083 B1* | 6/2004 | Nakamura | 358/487 |
| 6,765,224 B1* | 7/2004 | Favreau et al. | 250/559.4 |
| 2002/0085840 A1* | 7/2002 | Liebenow | 396/2 |
| 2003/0035103 A1* | 2/2003 | Werzinger et al. | 356/239.1 |
| 2004/0183921 A1* | 9/2004 | Ueda | 348/222.1 |
| 2004/0233307 A1* | 11/2004 | Tsujino | 348/255 |
| 2005/0012811 A1* | 1/2005 | Nakagawa et al. | 348/14.02 |
| 2005/0146758 A1* | 7/2005 | Tsuchihashi | 358/506 |
| 2005/0237410 A1* | 10/2005 | Shiohara | 348/333.01 |
| 2006/0067670 A1* | 3/2006 | Misawa | 396/226 |
| 2007/0285537 A1* | 12/2007 | Dwinell et al. | 348/263 |
| 2008/0088710 A1* | 4/2008 | Iwamoto et al. | 348/220.1 |

FOREIGN PATENT DOCUMENTS

| | | |
|---|---|---|
| EP | 1 257 117 A2 | 11/2002 |
| JP | 11-355787 | 12/1999 |
| JP | 2002-334326 | 11/2002 |

OTHER PUBLICATIONS

Yamada, Keeichi, et al.; A Vision Sensor Having an Expanded Dynamic Range for Autonomous Vehicles; IEEE Transactions on Vehicular Technology, vol. 47 No. 1, Feb. 1998; pp. 332-341.
European Patent Office partial European search report on application No. 08167843.5 dated Feb. 2, 2011; 6 pages.
European Patent Office extended search report on application No. 08167843.5 dated Apr. 18, 2011; 10 pages.

* cited by examiner

*Primary Examiner* — Lin Ye
*Assistant Examiner* — Amy Hsu
(74) *Attorney, Agent, or Firm* — Foley & Lardner LLP

(57) ABSTRACT

There is provided an image processing apparatus capable of properly setting a photographing condition in consideration of time allowable for each processing; the image processing apparatus capable of properly setting the photographing condition while referring to an actually generated composite image; the image processing apparatus capable of properly setting the photographing condition even by a user who has no background knowledge; and the image processing apparatus capable of determining whether or not image composition processing is properly executed even by the user who has no background knowledge. A setting mode screen displays a composite image based on generated output image data, together with "processing time", being expected time required for generating one output image data. The composite image is updated every time the output image data is generated.

2 Claims, 20 Drawing Sheets

Fig. 5
| Exposure time (second) | Brightness range |
|---|---|
| 1/10 | 10 to 30 |
| 1/20 | 20 to 40 |
| 1/40 | 30 to 50 |
| 1/80 | 40 to 60 |
| 1/160 | 50 to 70 |
| 1/320 | 60 to 80 |
| 1/640 | 70 to 90 |
| 1/1280 | 80 to 100 |
Fig. 6A
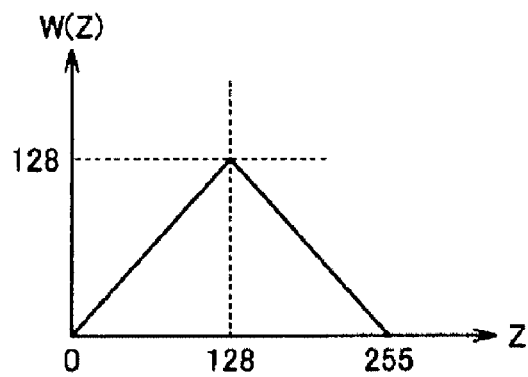
Fig. 6B
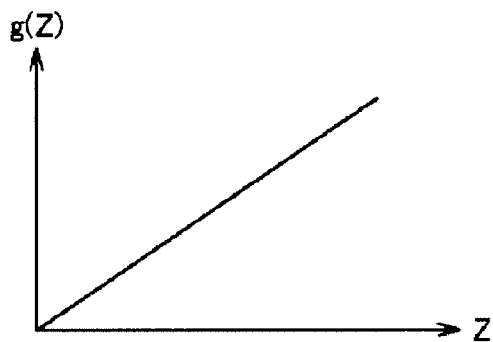

Image display  ○ Simple  ● High precision

Image display  ● Simple  ○ High precision

IMAGE PROCESSING APPARATUS

This application claims priority from Japanese patent application P2007-284130, filed on Oct. 31, 2007. The entire content of the aforementioned application is incorporated herein by reference.

BACKGROUND OF THE INVENTION

1. Field of the Invention

The present invention relates to an image processing apparatus that processes image data obtained by photographing a measuring object, and particularly relates to a technique of extending a dynamic range by photographing the measuring object a plurality of times under different exposure conditions.

2. Description of the Related Art

In a FA (Factory Automation) field, a so-called visual sensor is put to practical use, as an apparatus for optically inspecting a defect, etc, generated in a measuring object such as a workpiece, and optically measuring a size of this defect.

When an inspection and a measurement are performed by using the aforementioned visual sensor, the measuring object must be properly photographed. Generally, a dynamic range (a gradation range capable of expressing luminance) of an image pickup apparatus including a CCD (Coupled Charged Device) and a CMOS (Complementary Metal Oxide Semiconductor) sensor is limited. Therefore, when an exposure time at the time of photographing is prolonged, total or partial (overexposure) halation occurs, and luminance information and color information of the measuring object can not be accurately acquired. Reversely, when the exposure time is shortened, total or partial underexposure occurs, and therefore effective luminance information can not be acquired. Further, in the measuring object having a part of locally different reflectance and the measuring object having a part with large curvature, partial overexposure or underexposure occurs, under influence of lighting.

Thus, when a change width of an optical energy (brightness) generated from the same measuring object exceeds a range of the dynamic range of the image pickup apparatus, there is a problem that the whole body of the measuring object can not be properly photographed.

Therefore, a technique of extending the dynamic range is known, in which the dynamic range is extended by photographing the same measuring object a plurality of times under different photographing conditions (particularly exposure condition), and combining image data obtained by each photographing. Such a processing is also called a high dynamic composition processing and a super latitude processing (Super Latitude process; SL processing). For example, Japanese Patent Laid Open publication No. 2002-334326 discloses a visual sensor realizing extension of the dynamic range by a low calculation processing load.

Generally, as the number of times of photographing is increased, extension of the dynamic range and improvement of accuracy of a composite image can be expected. However, in this case, processing time is prolonged, along with an increase of the number of times of photographing. That is, extension of the dynamic range is in a trade-off relation with processing time. Incidentally, in an actual production site, inspection and measurement must be performed, directed to the measuring object sequentially conveyed on a conveying device such as a belt conveyor. Therefore, the processing time that can be allotted to each measuring object is limited. Accordingly, photographing conditions (exposure condition, the number of times of photographing, and lighting condition, etc.) must be properly set, with a balance between required accuracy of the composite image and the processing time in mind.

In addition, on a production line such as a small lot multi-product production, the kind of a workpiece, being the measuring object, is frequently changed. Even when such a workpiece is changed, fine adjustment of the photographing conditions must be performed.

Further, even in a case of an operator of the production line who does not have a total knowledge of a visual sensor, the photographing conditions must be set properly, and it is necessary to determine whether or not image composition processing is properly executed.

Therefore, the present invention is provided in order to solve the above-described problem, and a first object of the present invention is to provide an image processing apparatus capable of properly setting the photographing conditions, in consideration of the time allowable for each processing. Also, a second object of the present invention is to provide an image processing apparatus capable of properly setting the photographing conditions while referring to an actually generated composite image. In addition, a third object of the present invention is to provide an image processing apparatus capable of properly setting the photographing conditions, even in a case of a user having no background knowledge. Further, a fourth object of the present invention is to provide an image processing apparatus capable of determining whether or not the image composition processing is properly executed even in a case of a user who has no background knowledge.

SUMMARY OF THE INVENTION

According to a certain aspect of the present invention, there is provided an image processing apparatus connected to an image pickup part and a display part capable of changing exposure conditions for photographing a measuring object. The image pickup part includes an image pickup section constituted of an assembly of a plurality of pixels for photographing. The image processing apparatus includes a photographing controller that generates a plurality of image data by making the image pickup part photograph the measuring object a plurality of times under different exposure conditions; and a compositing section that generates composite image data based on luminance information of the plurality of image data. The compositing section includes a composite luminance calculator that calculates a luminance distribution according to a distribution of light intensity incident on an image pickup element of the image pickup section, as a composite luminance distribution of the composite image data, based on the luminance information of each image data and the corresponding exposure condition. The image processing apparatus includes a processing time calculator that calculates an expected processing time required from the plurality of times of photographing until the composite image data is generated, and a display section that displays the processing time on the display part.

According to the present invention, the time is displayed, which is required for generating the composite image data used in the image processing for the inspection or measurement. Therefore, production processing of the composite image data can be adjusted, in consideration of an actually applied performance of a production site, etc. Accordingly, the photographing conditions can be properly set in consideration of the allowable time.

Preferably, the image processing apparatus is further connected to the display part and the compositing section includes the display section that displays the processing time on the display part.

Preferably, the image processing apparatus is further connected to the display part, and executes image processing based on the composite image data, and the compositing section includes the display section that makes the display part display the time of a single measurement cycle including the processing time.

Preferably, the photographing controller controls the image pickup part so as to perform photographing under exposure conditions of prescribed numbers according to external setting, out of a plurality of exposure conditions settable in the image pickup part. The processing time calculator calculates the processing time based on the number of times of photographing by the image pickup part, exposure time in each case, and the processing time by the compositing section, which are defined by the exposure conditions.

Preferably, the photographing controller controls the image pickup part, so that the plurality of times of photographing by the image pickup part is successively repeated. The compositing section sequentially generates the composite image data, according to the repetition of the plurality of times of photographing by the image pickup part. The display section displays the composite image based on the composite image data together with the processing time, and updates the display of the composite image in association with execution of generation processing by the compositing section.

Preferably, the compositing section further includes a histogram generator that generates a histogram regarding composite luminance. The display section displays the histogram on the display part together with the composite image. The histogram generator generates the histogram in each cycle longer than a creation cycle of the composite image data by the compositing section.

According to further another aspect of the present invention, there is provided the image processing apparatus connected to the image pickup part and the display part, capable of changing the exposure conditions for photographing the measuring object. The image pickup part includes the image pickup section constituted of the assembly of a plurality of pixels for imaging. The image processing apparatus includes the photographing controller that generates a plurality of image data by making the image pickup part photograph the measuring object the plurality of times under different exposure conditions; the compositing section that generates the composite image data based on color information and luminance information of the plurality of image data; and the display section that displays the composite image on the display part based on the composite image data. The compositing section includes a composite luminance calculator that calculates a distribution of the light intensity incident on the image pickup element of the image pickup section as a composite luminance distribution of the composite image data, based on the exposure conditions corresponding to the luminance information of each data; and an accuracy determination section that calculates a value corresponding to the distribution of the light intensity incident on the image pickup element of the image pickup section based on the luminance distribution in a plurality of image data corresponding to specific points, and determines reliability of the composite image data, based on a coincidence between the corresponding values of each image data.

According to the present invention, the user can properly know the occurrence of a trouble, even when the trouble occurs in the composite image processing due to any cause, in the middle of performing the measurement and inspection for the measuring object flowing through the actual production line. Therefore, even the user who has no background knowledge can determine whether or not the image composition processing is properly executed.

Preferably, the accuracy determination section determines the reliability, based on a variation of converted values calculated by correcting each pixel in a plurality of image data, with a corresponding exposure amount.

Preferably, the image processing apparatus further includes a receiving section that receives the setting of a target region out of a photographing range in the image pickup part. The accuracy determination section determines the reliability based on a variation in each specific point in the target region.

According to the present invention, the photographing conditions can be properly set, in consideration of the time allowable for each processing. In addition, according to the present invention, the photographing conditions can be properly set, while referring to an actually generated composite image. Further, according to the present invention, even in a case of the user who has no background knowledge, the photographing conditions can be properly set. Further, according to the present invention, even the user who has no background knowledge can determine whether or not the image composition processing is properly executed.

BRIEF DESCRIPTION OF THE DRAWINGS

FIG. 5 shows a view illustrating an example of a relation between an exposure time set in an image pickup apparatus and a "brightness" range suitable for photographing;

FIGS. 6A to 6B show views illustrating an example of characteristics of a weighting function and a response function;

DETAILED DESCRIPTION OF THE PREFERRED EMBODIMENTS

Preferred embodiments of the present invention will be explained in detail, with reference to the drawings. Note that the same signs and numerals are assigned to the same part or the corresponding part in the figure, and explanation therefore is not repeated.

Embodiment 1

Overall Apparatus Structure

Figure 1:
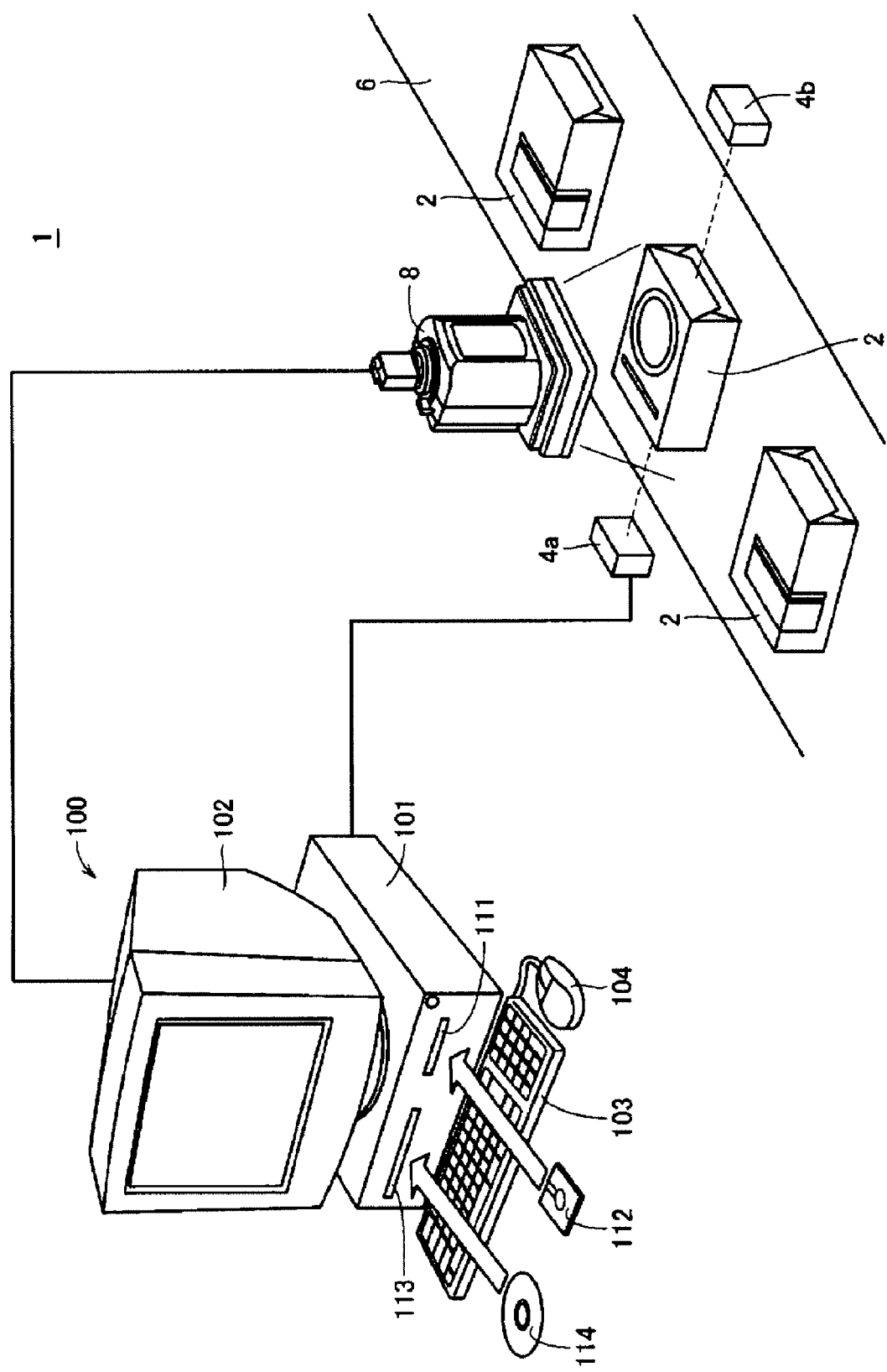
FIG. 1 shows a schematic view illustrating an overall structure of a visual sensor system including an image processing apparatus according to an embodiment 1 of the present invention.

FIG. 1 shows a schematic view illustrating an overall structure of a visual sensor system 1 including an image processing apparatus according to an embodiment 1 of the present invention.

In FIG. 1, the visual sensor system 1 is incorporated in a typical production line, and functions to optically inspect a defect, etc, in a measuring object (called a "workpiece" hereafter), and optically measure its size, etc.

As an example, in the embodiment 1 of the present invention, a workpiece 2 is conveyed by a conveying mechanism 6 such as a belt conveyor, and the conveyed workpiece 2 is sequentially photographed by an image pickup apparatus 8.

Image data (called "input image data" hereafter) photographed by the image pickup apparatus 8 is transferred to a computer 100 that is a typical example of realizing the image processing apparatus according to this embodiment.

Note that there may be further provided a lighting mechanism for emitting light to the workpiece 2 photographed by the image pickup apparatus 8.

In addition, photoelectrical sensors disposed on both ends of a conveying mechanism 6 detect arrival of the workpiece 2 in a photographing range of the image pickup apparatus 8.

Specifically, each photoelectrical sensor includes a light receiving part 4a and a light projecting part 4b disposed on the same optical axis, and arrival of the workpiece 2 is detected, by detecting the fact that a light emitted from the light projecting part 4b is shielded by the workpiece 2.

Note that the conveying mechanism 6 itself is controlled by a PLC (Programmable Logic Controller) not shown.

The image pickup apparatus 8 includes image pickup elements, being an assembly of a plurality of pixels for photographing, such as a lens, a CCD (Coupled Charged Device) and a CMOS (Complementary Metal Oxide Semiconductor) sensor, to thereby photograph the workpiece 2.

An image photographed by this image pickup apparatus 8 is constituted of a plurality of pixels, each having color information. This color information includes density values (R composition value, G composition value, and B composition value) of "red color", "green color", and "blue color", based on three primary colors of light. Alternatively, as the color information, it is also preferable to use density values (C composition value, M composition value, and Y composition value) of "cyan", "magenta", and "yellow", being complementary colors of the three primary colors of light, and also preferable to use color attributes including each parameter of "color phase (Hue)", "lightness (Value)", and "saturation (Chroma)"

Note that the image pickup apparatus 8 photographs the workpiece 2, according to the detection of the arrival of the workpiece 2 by the aforementioned photoelectrical sensor.

Particularly, in the image pickup apparatus 8 according to this embodiment, the exposure conditions for photographing are made changeable. The exposure conditions are expressed by set values of an energy quantity (brightness) of the light incident on the image pickup elements, and are typically adjusted by adjustment of an optical diaphragm amount and a mechanical or electronic shutter speed. In this embodiment, although a structure of adjusting "exposure time" is given as a typical example of the exposure conditions, the present invention is not limited to the exposure time and it may be also preferable to adjust the diaphragm amount.

Meanwhile, the computer 100 includes a computer body 101 on which an FD (Flexible Disk) driving apparatus 111 and a CD-ROM (Compact Disk-Read Only Memory) driving apparatus 113 are mounted; a monitor 102, a keyboard 103, and a mouse 104. Then, the computer body 101 executes previously stored programs, to thereby realize the image processing apparatus according to this embodiment.

<Hardware Structure>

Figure 2:
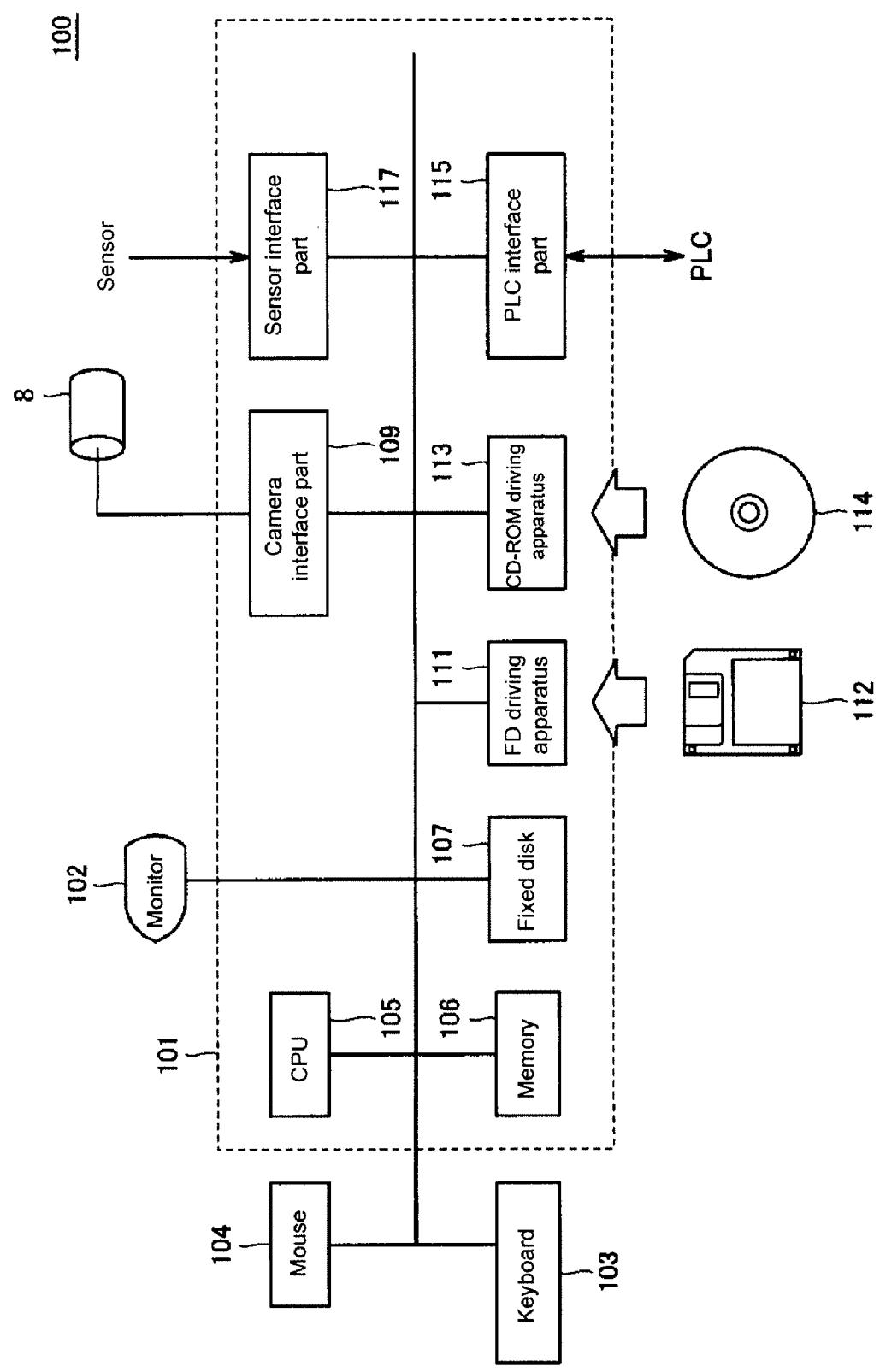
FIG. 2 shows a schematic block diagram illustrating a hardware structure of a computer.

FIG. 2 shows a schematic block diagram illustrating a hardware structure of the computer 100.

In FIG. 2, in addition to the FD driving apparatus 111 and the CD-ROM driving apparatus 113 shown in FIG. 1, the computer body 101 includes a CPU (Central Processing Unit) 105, a memory 106, a fixed disk 107, a camera interface part 109, a PLC interface part 115, and a sensor interface part 117, which are mutually connected by bus.

An FD 112 can be mounted on the FD driving apparatus 111, and a CD-ROM 114 can be mounted on the CD-ROM driving apparatus 113. As described above, the image processing apparatus according to this embodiment is realized by executing each program by the CPU 105 using computer hardware such as a memory 106. Generally, this program is stored in a recording medium such as the FD 112 and the CD-ROM 114, or is circulated via a network. Then, this program is read from the recording medium by the FD driving apparatus 111 and the CD-ROM driving apparatus 113, and is stored once in the fixed disk 107 that is a storage device. Further, this program is read from the fixed disk 107 to the memory 106, and is executed by the CPU 105.

The CPU 105 is an arithmetic processing part that executes each kind of calculation by sequentially executing a programmed command. The memory 106 temporarily stores each kind of information according to program execution by the CPU 105.

The camera interface part 109 is a device for mediating data communication between the computer body 101 and the image pickup apparatus 8, and functions to receive an electric signal showing the input image data photographed by the image pickup apparatus 8 and convert the received electric signal to a data format that can be processed by the CPU 105, and also convert a command outputted by the CPU 105 to the electric signal and send the converted electric signal to the image pickup apparatus 8. Particularly, the input image data photographed by the image pickup apparatus 8 is stored in the memory 106 or the fixed disk 107, via the camera interface part 109.

The PLC interface part 115 is a device for mediating data communication between the computer body 101 and a PLC not shown. Also, the sensor interface part 117 receives a detected signal from the aforementioned photoelectrical sensor, etc, and transmits the detected signal to the CPU 105.

The fixed disk 107 is a nonvolatile storage device that stores the program executed by the CPU 105 and the input image data.

The monitor 102 connected to the computer body 101 is a display device for displaying the information outputted from the CPU 105, and for example is constituted of an LCD (Liquid Crystal Display) and a CRT (Cathode Ray Tube), etc. As will be described later, the monitor 102 according to this embodiment displays the composite image generated by photographing the workpiece 2, the expected processing time required for a single processing, and the histogram regarding the luminance of the pixels constituting the composite image.

The mouse 104 receives the command from the user according to the operation such as click or slide. The keyboard 103 receives the command from the user according to the key to be inputted.

In addition, it may be also preferable that the computer 100 has other output device such as a printer connected thereto, as needed.

<Operation Mode>

The visual sensor system 1 according to this embodiment can select an "operation mode" for actually executing the inspection or measurement by using the output image data generated from the workpiece 2, and a "setting mode" for performing setting regarding suitable output image data according to the workpiece 2.

In the "setting mode", the user sets a suitable photographing condition, while referring to an output image (composite image) based on the output image data displayed on the monitor 102. Also, in the "operation mode", the output image data obtained by photographing the workpiece 2 actually flowing through the production line is generated, and the inspection or measurement is performed to this output image data.

<Image Composition Processing>

Next, the image composition processing for generating the output image data will be explained. The image composition processing according to this embodiment is mainly performed to extend a dynamic range of the image pickup apparatus 8.

Figure 3A:
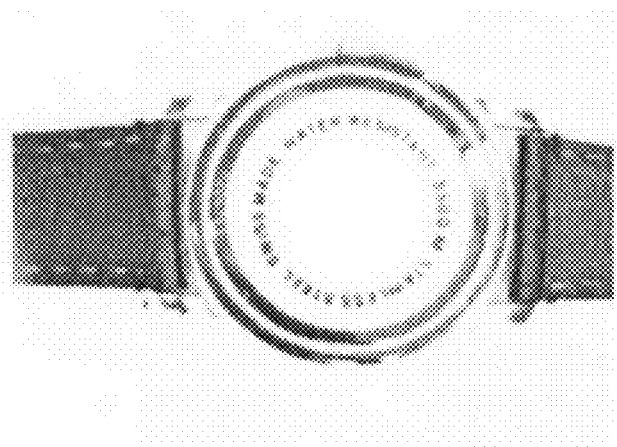
FIGS. 3A to 3C show views illustrating image data in a case of photographing a rear surface of a wrist band watch as a workpiece.
Figure 3B:
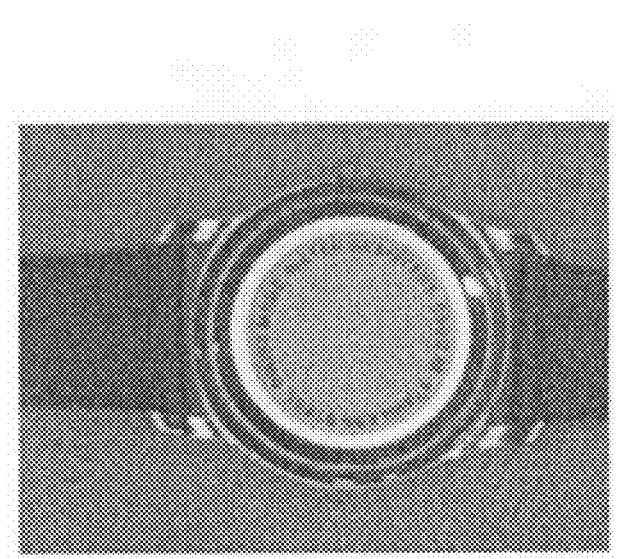
Figure 3C:
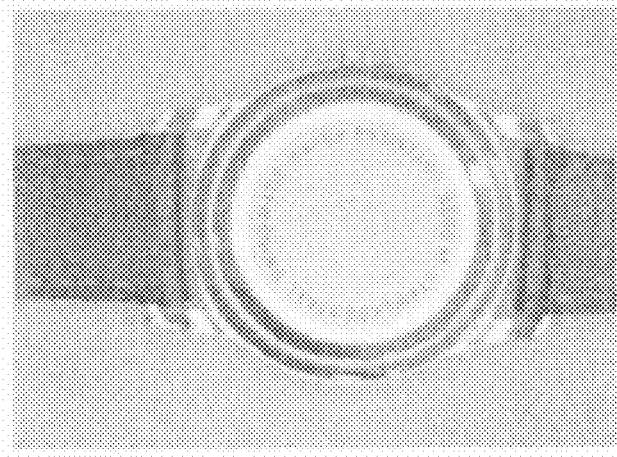

FIGS. 3A to 3C show a view illustrating the image data when a rear surface of a wrist band watch is photographed as a workpiece.

FIG. 3A illustrates a photographed image obtained by a single photographing under a condition in which the exposure time is set to be relatively long, and FIG. 3B illustrates a photographed image obtained by a single photographing under a condition in which the exposure time is set to be relatively short. Note that in FIG. 3A and FIG. 3B, the intensity of the light is set under the same condition. The workpiece shown in FIG. 3 includes a watch body part made of metal and a band part made of leather. Both of them have greatly different reflectance, and therefore there is also a great difference in an amount of an optical energy emitted from each part of the watch body part and the band part.

Therefore, when the exposure time is prolonged, overexposure occurs in the watch body part having relatively higher reflectance, and therefore luminance information can not be obtained. Namely, as shown in FIG. 3A, it is found that letters written on the watch body part can not be recognized. Meanwhile, when the exposure time is shortened, the optical energy can not be sufficiently received from the band part having relatively low reflectance, and therefore effective luminance information can not be obtained. Namely, as shown in FIG. 3B, it is found that underexposure occurs in the band part, and a defect such as a stitch can not be recognized.

Therefore, in the image composition processing according to this embodiment, the workpiece is photographed a plurality of times under different exposure conditions as shown in FIG. 3A and FIG. 3B, and regarding the photographed plurality of image data, composite luminance of the pixel of a certain coordinate position is calculated based on the luminance of each pixel corresponding to this coordinate position. Each composite luminance shows a value corresponding to the intensity of the light incident on each imaging pixel of the image pickup elements of the image pickup apparatus 8. Then, the composite image data is generated from the calculated composite luminance. Schematically speaking, in the calculation processing of this composite luminance, out of a series of corresponding pixels included in each image data, the pixel suitable for this exposure condition is preferentially adopted. In other words, the luminance of each pixel of the composite image data for expressing the workpiece is calculated by using the information of the pixel photographed under the exposure condition suitable for the optical energy emitted from a part corresponding to this pixel of the workpiece. By this processing, the composite image data can be generated, as an assembly of the pixels having the luminance photographed under a suitable exposure condition. FIG. 3C shows a view illustrating an example of the composite image data generated by the image composition processing according to this embodiment. As shown in FIG. 3C, by performing the aforementioned image composition processing, it is possible to generate the image data not including the overexposure as shown in FIG. 3A and the underexposure as shown in FIG. 3B.

The image composition processing according to this embodiment is mainly realized by four processing described hereunder.

(1) Processing of photographing the workpiece a plurality of times under different exposure conditions (photographing processing)

(2) Processing of calculating the composite luminance from the luminance information of the photographed image data (luminance composition processing)

(3) Processing of calculating composite color information from the color information of the photographed image data (color composition processing)

(4) Processing of generating the output image data from the composite color information and the composite luminance (generation processing)

<Control Structure>

Figure 4:
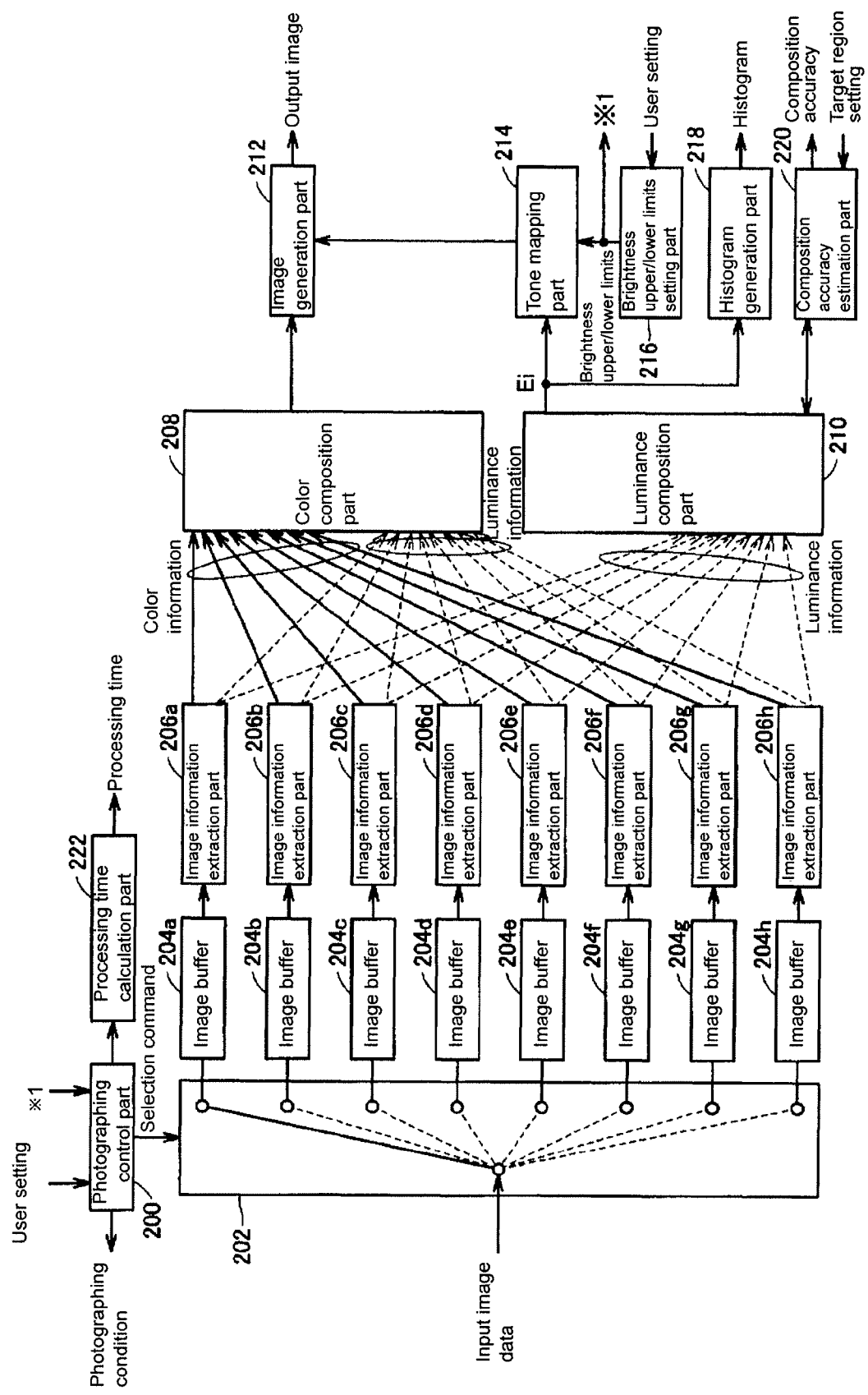
FIG. 4 shows a functional block diagram illustrating a control structure of the image processing apparatus according to the embodiment 1 of the present invention.

FIG. 4 shows a functional block diagram illustrating a control structure of the image processing apparatus according to the embodiment 1 of the present invention.

In FIG. 4, the image processing apparatus according to this embodiment includes a photographing control part 200; a selection part 202; image buffers 204a to 204h; and image information extraction parts 206a to 206h, as a control structure for realizing the aforementioned photographing processing (1). In addition, the image processing apparatus according to this embodiment includes a luminance composition part 210; a tone mapping part 214; a "brightness" upper/lower limits setting part 216; a histogram generation part 218; and a composition confirmation estimating part 220, as the control structure for realizing the aforementioned luminance composition processing (2), and includes a color composition part 208 as the control structure for realizing the aforementioned color composition processing (3). Further the image processing apparatus according to this embodiment includes an image generation part 212 as the control structure for realizing the aforementioned generation processing (4). Further, the image processing apparatus according to this embodiment includes a processing time calculation part 222.

Contents of each processing according to the aforementioned image composition processing will be explained, together with the operation of each functional block.

<(1) Photographing Processing>

In FIG. 4, the photographing control part 200 generates a plurality of image data by making the image pickup apparatus 8 photograph the workpiece a plurality of times under different exposure conditions. The photographing control part 200 determines how the exposure condition should be changed, according to a user setting. More specifically, the image pickup apparatus 8 according to this embodiment is constituted, so that a plurality of exposure times (shutter speeds) can be set, and eight settable exposure times are given as examples, such as "1/10 seconds", "1/20 seconds", "1/40 seconds", "1/80 seconds", "1/160 seconds", "1/320 seconds", "1/640 seconds", "1/1280 seconds". Such a settable exposure time group is set so as to be sequentially faster by a power of 2, with "1/10 seconds" as a reference (slowest value). The photographing control part 200 sequentially generates the image data by making the image pickup apparatus 8 sequentially photograph the workpiece, under the whole part or a part of the conditions of such a settable exposure time group. In synchronization with this change of the exposure time, the photographing control part 200 gives a selection command to the selection part 202.

The selection part 202 is disposed between the image pickup apparatus 8 and a plurality of image buffers 204a to 204h, and electrically connects any one of the image buffers 204a to 204h and the image pickup apparatus 8, according to the selection command from the photographing control part 200. In the description hereunder, the image buffers 204a to 204h are generally called "image buffers 204". Thus, the input image data photographed by the image pickup apparatus 8 is transmitted to one of the image buffers 204 according to the selection command from the photographing control part 200.

The image buffers 204a to 204h are storage parts for temporarily storing the input image data from the image pickup apparatus 8, and is constituted so as to correspond to the exposure time in the image pickup apparatus 8. Namely, each image buffer 204 is constituted so as to selectively store only the input image data photographed in a specific corresponding exposure time. For example, when the exposure time "1/10 seconds" is allotted to the image buffer 204a, the image buffer 204a stores only the input image data photographed under the exposure condition of "1/10 seconds" of the exposure time. Such a function is realized by outputting to the selection part 202 the selection command corresponding to the photographing condition, in synchronization with output of the photographing condition to the image pickup apparatus 8.

In addition, the photographing control part 200 successively repeats a series of photographing by the image pickup apparatus 8 (for example, eight photographing from "1/10 seconds" up to "1/1280 seconds" of the exposure times. Accordingly, the input image data stored in each image buffer 204 is updated in each cycle required for this series of photographing. Note that as will be described later, photographing about all exposure times settable in the image pickup apparatus 8 is not always executed, and the photographing is executed only in a required exposure time, being a part of the aforementioned all exposure times in some cases.

The image information extraction parts 206a to 206h correspond to the image buffers 204a to 204h respectively, and extract the color information and the luminance information from the input image data stored in the corresponding image buffer 204. The input image data is typically constituted of a plurality of pixels arranged in a matrix shape, each pixel having density values (R composition value, G composition value, and B composition value) of "red color", "green color", and "blue color". Then, the color information is expressed by relative values of the density values (mutual ratio) of "red color", "green color", and "blue color" for each pixel, and the luminance information is expressed by the luminance for each pixel (average density values of "red color", "green color", and "blue color"). Note that in this embodiment, the R composition value, the G composition value, and the B composition value are all defined in a range of 8 bits (0 to 255 gradation values). Therefore, the luminance is also defined in a range of 8 bits (0 to 255 gradation values).

Then, the image information extraction parts 206a to 206h output the extracted color information to the color composition part 208, and also output the extracted luminance information to the color composition part 208 and the luminance composition part 210.

<(2) Luminance Composition Processing>

In FIG. 4, the luminance composition part 210 calculates the composite luminance of each pixel, based on the luminance information of each input image data photographed by the image pickup apparatus 8, and the corresponding exposure condition. As described above, by changing the exposure time, the range of the optical energy (brightness) suitable for photographing is fluctuated. Namely, when the exposure time is relatively shorter, photographing of a larger range of the optical energy is suitable, and when the exposure time is relatively longer, photographing of a smaller range of the optical energy is suitable.

Generally, it is so considered that the optical energy received by the image pickup apparatus 8 is proportional to the exposure time. Meanwhile, "brightness" can be shown as a logarithm. Therefore, a "brightness" range suitable for the photographing by the image pickup apparatus 8 can be previously defined, so as to correspond to each exposure time settable in the image pickup apparatus 8.

More specifically, eight exposure times settable in the image pickup apparatus 8 according to this embodiment is made sequentially shorter by a power of 2. Therefore, a relation between each exposure time and the "brightness" can be defined as shown in FIG. 5.

FIG. 5 shows a view illustrating an example of the relation between the exposure time set in the image pickup apparatus 8 and the "brightness" suitable for photographing.

In FIG. 5, when the "brightness" range suitable for photographing is set to be "10 to 30" in a case of the exposure time of "1/10 seconds", the "brightness" range suitable for photographing is added with "10" and can be set to be "20 to 40" in a case where the exposure time is set to be "1/20 seconds" obtained by multiplying the exposure time by ½ times. By thus sequentially setting the "brightness" range, it is possible to set the exposure time so as to correspond to a range of "1/10 seconds" to "1/1280 seconds" to cover the "brightness" range of "10 to 100". Note that this "brightness" range is expressed by relative values that depend on performance of the image pickup apparatus 8, and even in a case of the same "brightness", actual brightness is different if sensitivity of the image pickup element and an open value of an optical system are different.

In addition, it is preferable to set an effective "brightness" range so as to be covered by a plurality of exposure times. In the example illustrated in FIG. 5, when the "brightness" range is set to be 10 to 90, this range is set so as to be covered by at least two exposure times. Namely, for example, exposure time in which the "brightness" corresponds to "50" is in three exposure times of "1/40 seconds", "1/80 seconds", and "1/160 seconds". With this setting, even in a case of a narrow range of the upper/lower limits values of the "brightness" inputted by a user, a plurality of photographing is selected in different exposure times.

The relation between the exposure time and the "brightness" range illustrated in FIG. 5 shows that, as will be described later, when a required "brightness" range is set by a user out of the "brightness" ranges that can be photographed by the image pickup apparatus 8, photographing is performed in a plurality of exposure times corresponding to this setting. Namely, the photographing is not performed in all exposure times settable in the image pickup apparatus 8, and only the photographing in a specific exposure time is performed, thus making it possible to shorten the processing time concerning the image composition processing.

More specifically, when the user sets the "brightness" range in a range of "30 to 60", photographing is performed in three exposure times of "1/20 seconds", "1/40 seconds", and "1/80 seconds" included in this range.

In FIG. 4 again, the luminance composition part 210 calculates the luminance of each pixel of the output image data by using the plurality of input image data obtained by photographing the workpiece a plurality of times. More specifically, the luminance composition part 210 calculates the composition luminance of each pixel by standardizing the luminance of each pixel by the exposure time (optical energy or light quantity), in the input image data of p-numbers corresponding to each pixel (coordinate position i) of the output image data. Calculation formula of composite luminance $E_i$ by the luminance composition part 210 is as follows.

$$E_i = \frac{10 * \sum_{j=1}^{p} w(Z_{i,j}) \left( \log_2 \frac{g(Z_{i,j})}{T_j} - 8 \right)}{\sum_{j=1}^{p} w(Z_{i,j})}$$ [Formula 1]

wherein,
w(Z): weighting function
g(Z): response function of the image pickup apparatus
$(Z_{i,j})$ coordinate position i of the j-th input image data
$T_j$: exposure time of the j-th input image data In the above-described formula, the term of "$\log_2(g(Z_{i,j})/T_j)$" corresponds to a value evaluated as "brightness", with the luminance in each input image data standardized by means of the exposure time. This is based on a technical concept that when the exposure time is relatively shorter, its actual "brightness" should be evaluated as a further greater value, and when the exposure time is relatively longer, its actual "brightness" should be evaluated as a further smaller value, even if the luminance shows the same value such as "128".

Typically, the composite luminance $E_i$ is calculated as a value in a range of 0 to 100, according to a relation between each exposure time shown in FIG. 5 and a "brightness" range. Note that in order to make it easy to understand, the composite luminance $E_i$ is expressed in the range of 0 to 100. However, gradation of the "brightness" of the image obtained by composition is greater than the gradation (such as 8 bits) of the image obtained under one exposure condition, and therefore is expressed as data, by a value including digits after a decimal point (such as 16 bits).

In the above-described formula, a weighting function w(Z) and a response function g(Z) of the image pickup apparatus 8 are introduced. These functions will be explained, with reference to FIG. 6.

FIGS. 6A and 6B show a view illustrating an example of the characteristics of the weighting function and the response function. FIG. 6A shows the characteristics of the weighting function w(Z), and FIG. 6B shows the characteristics of the response function g(Z).

In FIG. 6A, the weighting function w(Z) is a function for reflecting the reliability, according to the value of the luminance outputted from the image pickup apparatus 8. Namely, under a certain exposure condition, regarding a value closer to the lower limit value (0) or the upper limit value (255) out of the luminance outputted from the image pickup apparatus 8, the reliability is considered to be low, compared with a value closer to the intermediate value (128). In other words, if the image pickup apparatus 8 photographs the workpiece having the most suitable "brightness" under a certain exposure condition, this luminance is considered to have approximately the intermediate value.

Therefore, in consideration of such characteristics, as the weighting function w(Z), it is preferable to use the function in which the value near the lower limit value or the upper limit value is smaller, compared with the value near an intermediate level of the gradation scale. As an example, this embodiment adopts a triangular weighting function in which the intermediate level of the luminance gradation scale becomes a maximum value (128) and the lower limit value and the upper limit value become respectively zero.

Also, in FIG. 6B, the response function g(Z) is the function for compensating non-linearity between the luminance outputted from the image pickup apparatus 8 and the optical energy inputted into the image pickup apparatus 8. For example, in the image pickup element such as a CCD, the relation between the inputted optical energy or the light quantity, and an outputted voltage signal is shown by a non-linear shape. Such a non-linear characteristic is called a gamma characteristic. By the response function g (Z), the gamma characteristic is compensated, and the luminance outputted from the image pickup apparatus 8 is corrected to be proportional to the optical energy actually inputted into the image pickup apparatus 8. Note that FIG. 6B shows the response function g(Z) when the luminance outputted from the image pickup apparatus 8 is in a proportional relation with the inputted optical energy, for simplifying the explanation.

Note that "−8" of a constant term in the above-described formula is the term for compensating an offset generated when the relation between each exposure time and the "brightness" range is defined as shown in FIG. 5, and this term can be suitably set according to the relation between each exposure time and the "brightness" range.

In addition, in the above-described formula, logarithm with "2" set as a base is used. However, the base is not necessarily limited to "2", and a common logarithm with Napier number "e" set as a base, and a natural logarithm with "10" set as a base may also be used.

(Tone Mapping)

In FIG. 4 again, the luminance composition part 210 outputs the calculated composite luminance $E_i$ to a tone mapping part 214. The tone mapping part 214 generates the luminance information for generating the output image data based on the composite luminance $E_i$. Specifically, by assigning each composite luminance $E_i$ (luminance range: 0 to 100, however, having greater gradations than 256 gradations) to the luminance range of the output image data (such as 0 to 255 gradation values), the tone mapping part 214 generates the luminance information of the output image data. Note that resolution (dynamic range) of each composite luminance $E_i$ is higher than that of the input image data, and therefore by forming further multi-gradational luminance range of the output image data, the output image data with further precision can be generated.

Particularly, the tone mapping part 214 assigns a prescribed range of the composite luminance $E_i$ to the luminance range of the output image data, according to the setting of "brightness" upper/lower limits by the user as will be described later.

Figure 7:
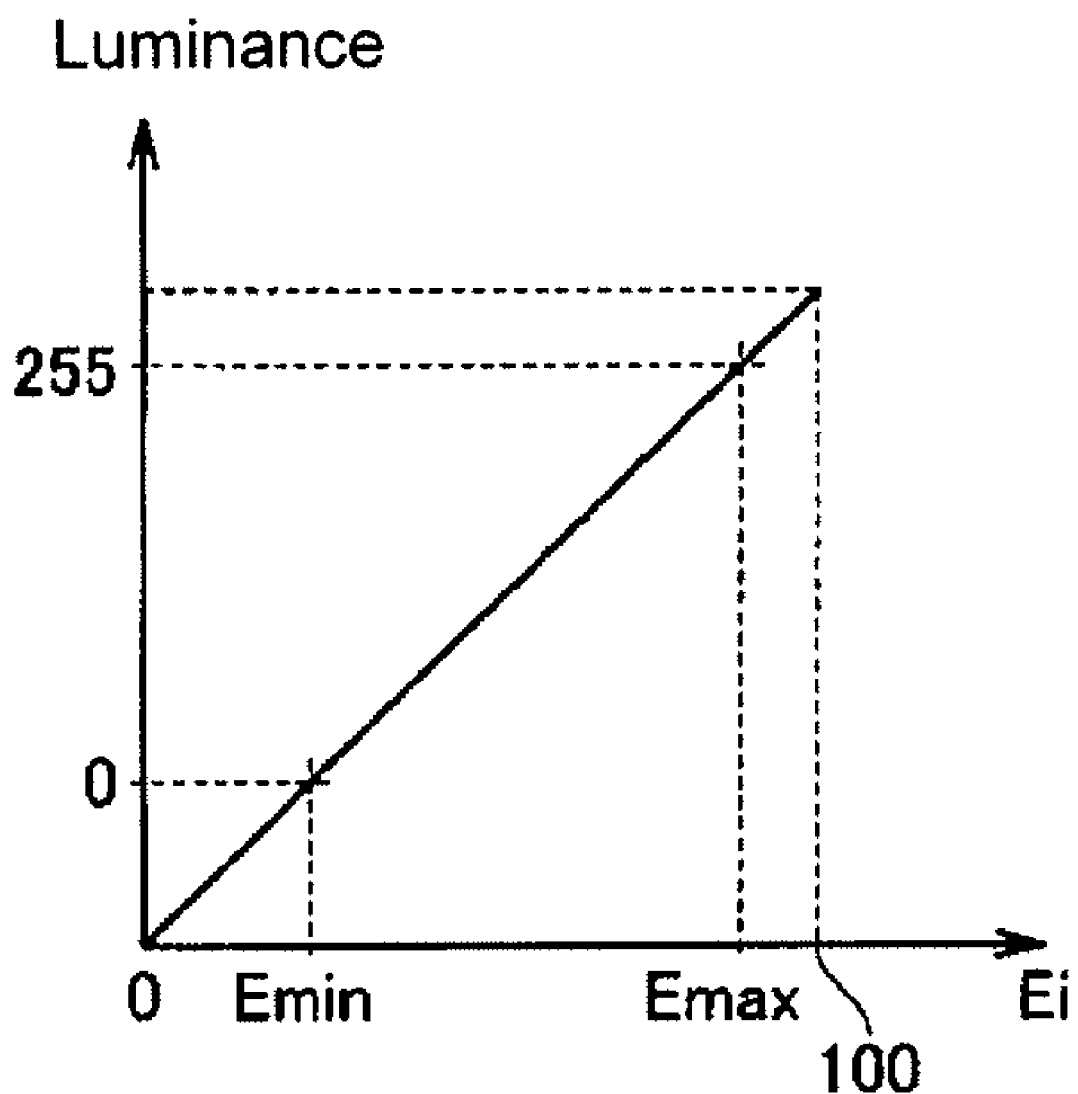
FIG. 7 shows a view for explaining an assignment processing by a tone mapping part.

FIG. 7 shows a view for explaining the assignment processing by the tone mapping part 214. In FIG. 7, in order to simplify the explanation, the explanation will be given for a case in which the tone mapping part 214 performs linear assignment processing. As a most simple example, the luminance range of 0 to 100 is allotted to a gradation scale of 0 to 255, while maintaining a proportional relation of the composite luminance $E_i$ to the inputted optical energy. Thus, the data having a greater gradation than a display capability of the monitor can be displayed with a gradation (such as 8 bits display) compatible with the display capability of the monitor.

As described above, when "brightness" upper limit value $E_{max}$ and "brightness" lower limit value $E_{min}$ are set by the user, the tone mapping part 214 assigns this range of the composite luminance $E_i$ to luminance $Y_i$, in accordance with the following formula.

$$Y_i = 255 \times (E_i - E_{min})/(E_{max} - E_{min})$$

Calculation Example

As described above, when the luminance at coordinate positions i of three input image data photographed in three exposure times of "1/20 seconds", "1/40 seconds", and "1/80 seconds" are respectively "190", "100", and "50", the composite luminance $E_i$ of the pixel corresponding to this coordinate position i is calculated as follows. Wherein, W(190)=65, W(100)=100, and W(50)=50.

$$E_i = 10 \times \{65 \times (\log 190 + \log 20 - 8) + 100 \times (\log 100 + \log 40 - 8) + 50 \times (\log 50 + \log 80 - 8)\}/(65 + 100 + 50) = 40$$

Then, when the "brightness" upper limit value $E_{max}$ is set at "60", and the "brightness" lower limit value $E_{min}$ is set at "30" by the user, the luminance $Y_i$ of the output image data is calculated as follows.

$$Y_i = 255 \times (40 - 30)/(60 - 30) = 85$$

(Generation of Histogram)

In FIG. 4 again, the luminance composition part 210 outputs the calculated composite luminance $E_i$ to the histogram generation part 218. The histogram generation part 218 generates the histogram regarding the composite luminance $E_i$. Namely, the histogram generation part 218 classifies the composite luminance $E_i$ of each pixel into classes of prescribed widths and integrates the number of pixels, based on the composite luminance $E_i$ of each pixel. This assists the aforementioned user setting of the "brightness" upper limit value and the "brightness" lower limit value, while referring to the range of relatively higher ratio in the composite luminance $E_i$ calculated by the luminance composition part 210.

In addition, the histogram generation part 218 is constituted, so that generation processing of the histogram is suspended or restarted, according to the user setting as will be described later.

<(3) Color Composition Processing>

In FIG. 4, the color composition part 208 calculates the composite color information from the color information of a plurality of input image data. As will be described later, each pixel of the output image data is obtained by multiplying the composite color information calculated by the color composition part 208, by the luminance calculated by the luminance composition part 210 and the tone mapping part 214. Therefore, the composite color information outputted from the color composition part 208 is expressed by the values showing a relative ratio of the "red color", "green color", and "blue color".

In addition, in the same way as the aforementioned luminance composition part 210, the color composition part 208 calculates the composite color information of each pixel of the output image data, based on the color information of each pixel in a plurality of input image data corresponding to each coordinate position. More specifically, the color composition part 208 generates the composite color information by performing cumulative addition of the values obtained by multiplying the color information of each input image data by weighting according to its reliability.

Here, the color information at a coordinate position i of the j-th input image data is defined as $(r_{i,j}, g_{i,j}, b_{i,j})$. However, the color composition part 208 standardizes the color information outputted from the image information extraction parts 206a to 206h, so as to establish the equation, $r_{i,j} + g_{i,j} + b_{i,j} = 1$. In addition, the luminance at the coordinate position i of the j-th input image data is defined as $Z_{i,j}$. When standardized color information and luminance are used, a calculation formula of the composite color information $(r_i, gi, b_i)$ is as follows.

$$r_i = \frac{\sum_{j=1}^{p} w(Z_{i,j}) \cdot r_{i,j}}{\sum_{j=1}^{p} w(Z_{i,j})}$$ [Formula 2]

$$g_i = \frac{\sum_{j=1}^{p} w(V_{i,j}) \cdot g_{i,j}}{\sum_{j=1}^{p} w(Z_{i,j})}$$

$$b_i = \frac{\sum_{j=1}^{p} w(Z_{i,j}) \cdot b_{i,j}}{\sum_{j=1}^{p} w(Z_{i,j})}$$

wherein, w(Z): weighting function p: number of input image data

Here, the weighting function w(Z) has the same characteristic as that of FIG. 6A. Namely, the weighting function w(Z) is the function for reflecting the reliability, according to the value of the luminance outputted from the image pickup apparatus 8. A technical meaning of this weighting function w(Z) has been described above, and therefore detailed explanation therefore is not repeated.

Then, the color composition part 208 outputs the calculated composite color information to the image generation part 212.

<(4) Generation Processing>

The image generation part 212 sequentially calculates the image information of the pixel at the coordinate position i by sequentially multiplying the luminance $Y_i$ generated by the luminance composition part 210 and the tone mapping part 214, by the corresponding composite color information ($r_i, g_i, b_i$), and thereby generates the output image data.

Namely, absolute color information ($R_i, G_i, B_i$) at the coordinate position i of the output image data can be expressed as follows.

$$(R_i, G_i, B_i) = Y_i \times (r_i, g_i, b_i)$$

The output image data is generated, in accordance with the aforementioned procedures of (1) to (4). Note that in the photographing processing of (1), a series of photographing operation is repeatedly executed, and in synchronization with this repeated execution of the photographing processing, the processing of (2) to (4) is also executed.

<Calculation of Processing Time>

In FIG. 4 again, the processing time calculation part 222 calculates the expected processing time required for generating one output image data. More specifically, based on the information from the photographing control part 200, the processing time calculation part 222 estimates the processing time, in consideration of the number of times of photographing by means of the image pickup apparatus 8, the exposure time in each photographing, and processing amount of the image composition processing. This processing time corresponds to the time required for generating one output image data in an operation mode, and the user determines the setting applicable to the actual production line, with reference to this processing time.

<Composition Accuracy Estimation>

Based on the luminance of the pixel in each input image data corresponding to each coordinate position, the composition accuracy estimation part 220 determines the reliability (called "composition accuracy" hereafter) of the generated output image data. In the image composition processing according to this embodiment, the same workpiece is photographed a plurality of times, with only the exposure condition changed, to acquire the input image data, and by using the acquired plurality of input image data, the output image data is generated. Therefore, non-movement of the workpiece and non-changing of the lighting condition are required during photographing. However, in the actual production line, it is estimated that the workpiece is moved and the lighting condition is changed. When such an original photographing condition is not satisfied, correct output image data can not be combined, and therefore the user must be notified of this case.

Specifically, the composition accuracy estimation part 220 determines whether or not the light of the same intensity is received by the pixels at the same positions regarding a plurality of images, being composition targets, photographed in different exposure times, and thereby determines the composition accuracy. More specifically, the composition accuracy estimation part 220 compares the values of the luminance of each pixel in a plurality of input image data corresponding to each coordinate position standardized by the exposure time, and estimates the composition accuracy. Namely, the composition accuracy estimation part 220 monitors the processing by the luminance composition part 210, and determines the composition accuracy based on a variation of the standardized values calculated in the calculation step of the composite luminance of each pixel.

For example, when the luminance at the coordinate positions i of three input image data photographed in three exposure times of "1/20 seconds", "1/40 seconds", "1/80 seconds" are respectively "190", "100", and "50", the standardized luminance at the coordinate positions i is calculated respectively as follows.

(log 190+log 20−8)=39

(log 100+log 40−8)=40

(log 50+log 80−8)=40

Then, the composition accuracy estimation part 220 calculates a standard deviation of standardized luminance assembly (39, 40, 40) for each coordinate position, and determines whether or not this standard deviation exceeds a prescribed threshold value. Then, when the standard deviation is a prescribed threshold value or less, it is so determined that the reliability at this coordinate position is sufficient, and reversely when the standard deviation exceeds the prescribed threshold value, it is so determined that the reliability of the composite luminance at this coordinate position is insufficient. Then, the composition accuracy estimation part 220 so determines that the reliability of this output image data is high, when the total number of the coordinate positions determined to have insufficient reliability has a prescribed ratio or more with respect to the number of pixels constituting the output image data. Otherwise, the composition accuracy estimation part 220 so determines that the reliability of this output image data is low.

Further, the composition accuracy estimation part 220 is constituted so that target region setting from the user can be received, and in the input image data, the composition accuracy may be estimated for the pixel included in a range of the inputted target region setting. In many production lines, inspection or measurement is not performed to the whole region that can be photographed by the image pickup apparatus, and it is sufficient to perform inspection or measurement to a part of the region corresponding to a target workpiece. Therefore, in order to further efficiently perform processing, it is sufficient to perform estimation processing of the composition accuracy only for the target region.

Note that the estimation processing of the composition accuracy in the composition accuracy estimation part 220 is preferably executed in the operation mode, and this processing is suspended in a setting mode.

<Screen Display Example>

Figure 8:
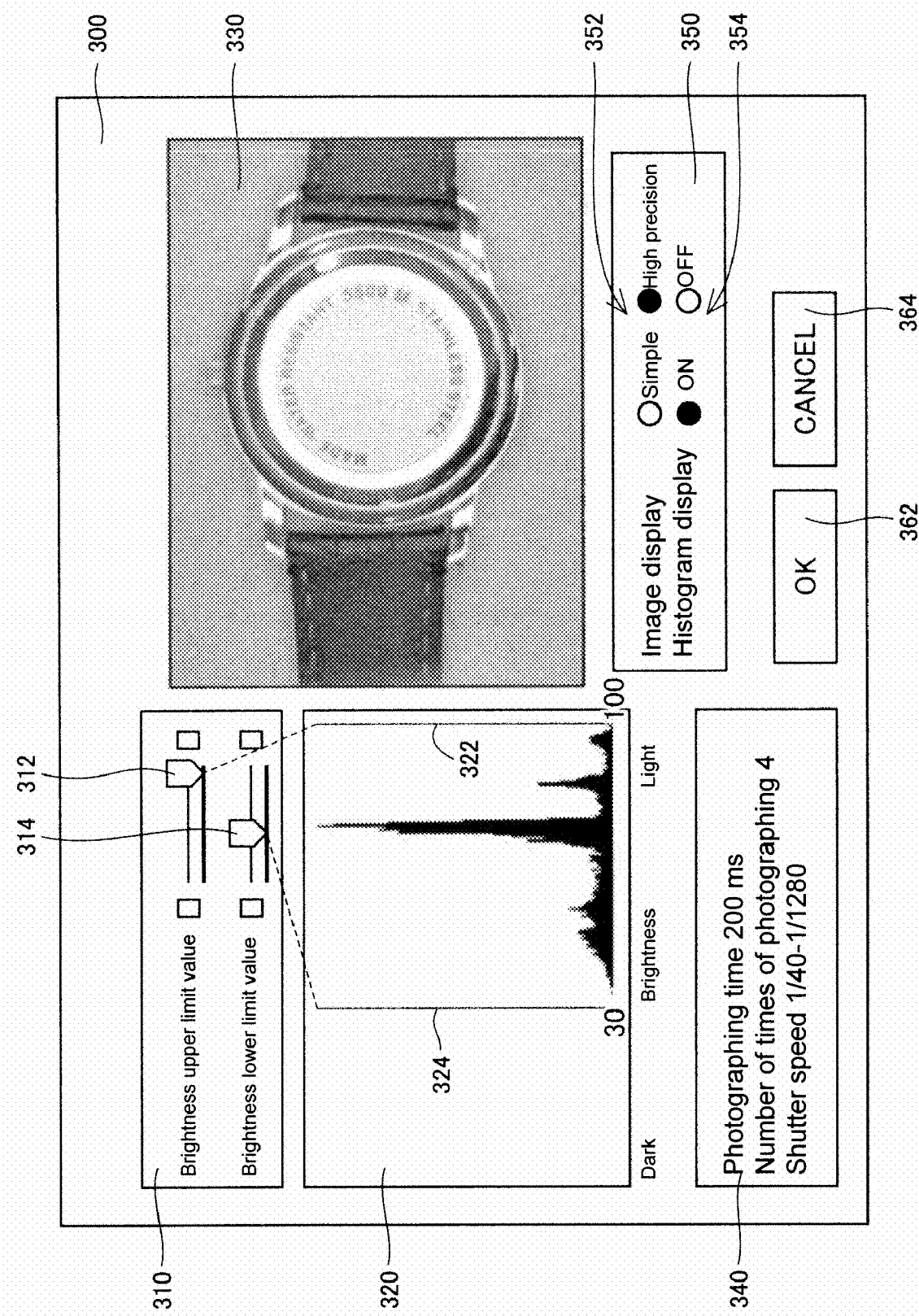
FIG. 8 shows a view illustrating a screen display example in a "setting mode" displayed on a monitor of the image processing apparatus according to the embodiment 1 of the present invention.
Figure 9:
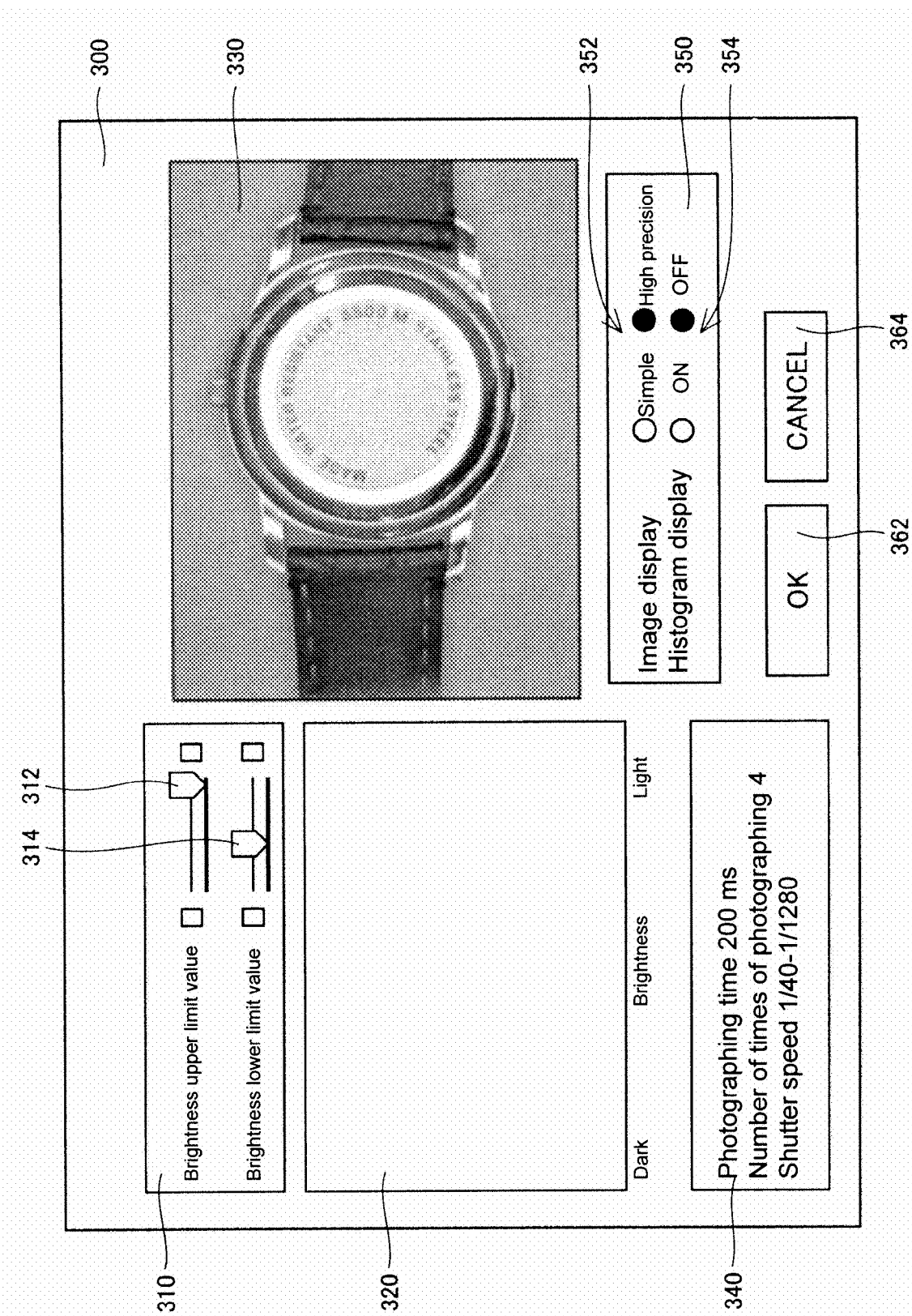
FIG. 9 shows a view illustrating the screen display example in the "setting mode" displayed on the monitor of the image processing apparatus according to the embodiment 1 of the present invention.

FIG. 8 and FIG. 9 show views illustrating a screen display example in a "setting mode" displayed on the monitor of the image processing apparatus according to the embodiment 1 of the present invention.

In FIG. 8 and FIG. 9, when the "setting mode" is selected, a setting mode screen 300 is displayed on the monitor 102. Note that by combining functions of the CPU 105 and a graphic board not shown, the setting mode screen 300 is displayed on the monitor 102. Such a screen display is realized by a GUI (Graphical User Interface) program incorporated as a part of OS (Operating System), and the GUI also provides an environment for performing various user settings on the screen by using a cursor, operated by a keyboard 103 and a mouse 104 by the user.

The setting mode screen 300 includes a "brightness" upper/lower limits input area 310, a histogram display area 320, a composite image display area 330, a photographing information display area 340, and a display mode selection area 350.

In the "brightness" upper/lower limits input area 310, there are disposed a slide bar 312 for setting the "brightness" upper limit value, and a slide bar 314 for setting the "brightness" lower limit value. The "brightness" upper/lower limits values set by the operation of these slide bars 312 and 314 are inputted into a "brightness" upper/lower limits setting part 216 (FIG. 4). Then, according to these "brightness" upper/lower limits values, required exposure time is selected based on a relation shown in FIG. 5, and the number of times of photographing and the exposure time in the image pickup apparatus 8 are changed.

The histogram generated in the histogram generator 218 (FIG. 4) is visually displayed in a histogram display area 320. Further, on this histogram, position display is made respectively at positions corresponding to the "brightness" upper/lower limits values set by the operation of the aforementioned slide bars 312 and 314.

The composite image based on the output image data generated according to the set "brightness" upper/lower limits values is displayed in a composite image display area 330. The composite image displayed in this composite image display area 330 displays the image data used in the inspection or measurement in the operation mode, and with reference to the display of this composite image display area 330, the user adjusts the setting of the lighting condition for the workpiece and the setting of the "brightness" upper/lower limits values.

In addition, the display of the composite image display area 330 is updated every time the output image data is generated by the image generation part 212. Therefore, the composite image can be displayed for the user, substantially like a moving image. Note that the cycle of updating the display of this composite image depends on the time required for the photographing time and the image composition processing performed by the image pickup apparatus 8. Therefore, in the image processing apparatus according to this embodiment, as will be described later, this updating cycle can be shortened.

In a photographing information display area 340, "photographing time", "the number of times of photographing", and "shutter speed" are displayed. The "photographing time" is the expected processing time required for generating one output image data calculated by the processing time calculation part 222 (FIG. 4). Also, the "the number of times of photographing" displays the number of times of photographing (namely, the number of input image data) required for generating the output image data, and the "shutter speed" displays the range of the shutter speed set (or settable) in the image pickup apparatus 8.

In a display mode selection area 350, a radio button 352 for selecting the display accuracy of the composite image displayed in the composite image display area 330, and a radio button 354 for selecting display/non-display of the histogram in the histogram display area 320, are displayed. Note that the setting mode screen 300 of FIG. 8 shows a case of selecting the display of the histogram, and the setting mode screen 300 of FIG. 9 shows a case of selecting the non-display of the histogram.

Further, in the setting mode screen 300, an "OK" button 362 and a "CANCEL" button 364 are disposed, and when the user selects the "OK" button 362, the value set in each item is stored in the fixed disk 107, etc, and then the mode is set in the "operation mode". Meanwhile, when the user selects the "CANCEL" button 364, the value set in each item is not stored in the fixed disk 107, etc, and then the mode is set in the "operation mode".

<Display/Non-Display of the Histogram>

As shown in FIG. 8, even when the output image data can be generated by using the input image data photographed under a specific exposure condition to display the histogram, photographing must be performed under all exposure conditions basically settable in the image pickup apparatus 8. This is because the user must display the histogram in consideration of all exposure conditions, so that the "brightness" upper/lower limits values can be changed by the user.

Meanwhile, when the user sets the histogram in the non-display, the aforementioned consideration is not necessary, and therefore it is sufficient to photograph only the input image data required for the generation processing of the output image data. Namely, it is sufficient to photograph the workpiece under a required exposure condition and for a required number of times. By thus efficiently performing the processing, the time required for the image composition processing can be shortened and the updating of the composite image in the composite image display area 330 can be performed fast.

Figure 10:
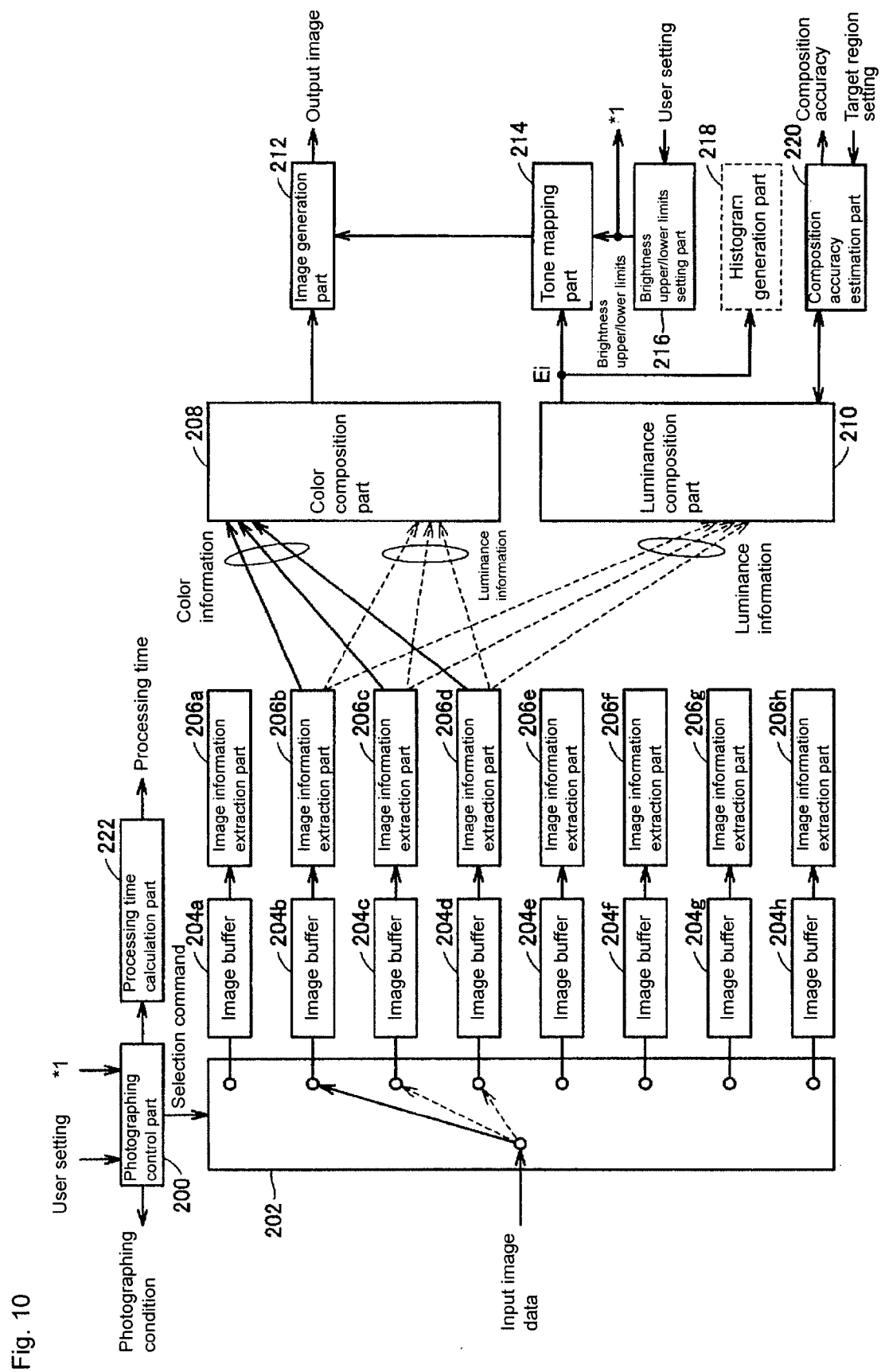
FIG. 10 shows a view for explaining an operation of a control structure of the image processing apparatus when a non-display of a histogram is selected.

FIG. 10 shows a view for explaining the operation of a control structure of the image processing apparatus, when the non-display of the histogram is selected.

In FIG. 10, as an example, when the output image data is combined from three input image data, the corresponding three exposure conditions are sequentially set, and photographing by means of the image pickup apparatus 8 is performed. Note that in a case shown in FIG. 9, the histogram generation part 218 temporarily suspends the generation processing of the histogram.

In this processing, it is found that the input image data is outputted only from three image buffers 204 out of eight image buffers 204. Thus, when the histogram is selected to be non-display, it is possible to improve the efficiency of the photographing time and the image composition processing time by means of the image pickup apparatus 8, and the whole processing time can be shortened.

<Setting of "Brightness" Upper/Lower Limits Values>

The photographing control part 200 (FIG. 4) determines the exposure time and the number of times of photographing concerning the measurement of the workpiece, with reference to the relation shown in FIG. 5, according to the "brightness" upper/lower limits values set by the user. At this time, the tone mapping part 214 assigns the range corresponding to the composite luminance, to the luminance range of the output image data, and therefore it is also possible to display the composite image focusing on the region of an arbitrary "brightness" in the workpiece.

For example, it is possible to display the image of 0 to 255 gradations, with the lower limit value of the designated "brightness" set at "0", and the upper limit value thereof set at "255".

FIGS. 11A to 11D show a view illustrating an example of the relation between the "brightness" upper/lower limits values and the composite image, in the image processing apparatus according to the embodiment 1 of the present invention. Note that the workpiece has the same rear surface of the wrist band as that of FIGS. 3A to 3C.

Figure 11A:
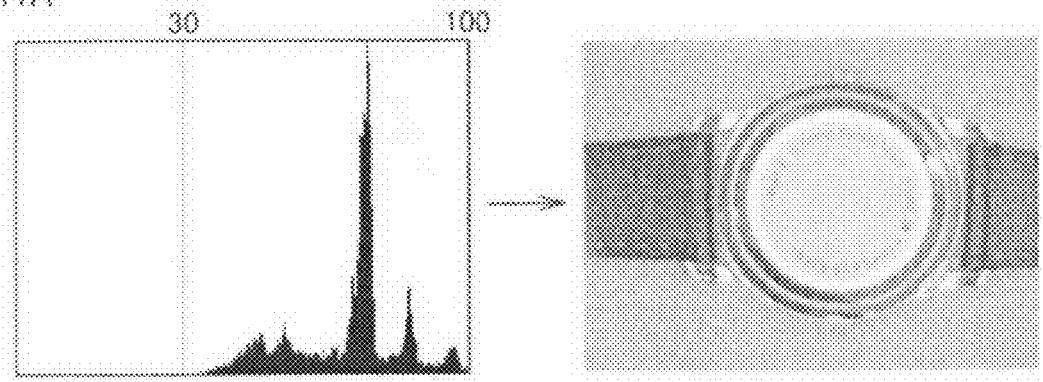
FIGS. 11A to 11D show views illustrating an example of a relation between a "brightness" upper/lower limits value and a composite image in the image processing apparatus according to the embodiment 1 of the present invention.

As shown in FIG. 11A, by setting the range in which an effective pixel appears in the histogram, to the "brightness" upper/lower limits values, it is found that the watch body part made of metal and the band part made of leather having greatly different reflectance are clearly photographed.

Figure 11B:
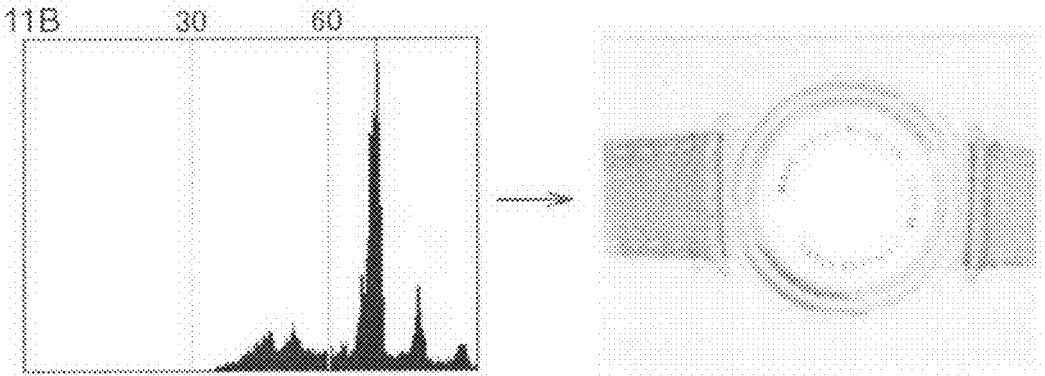
Figure 11C:
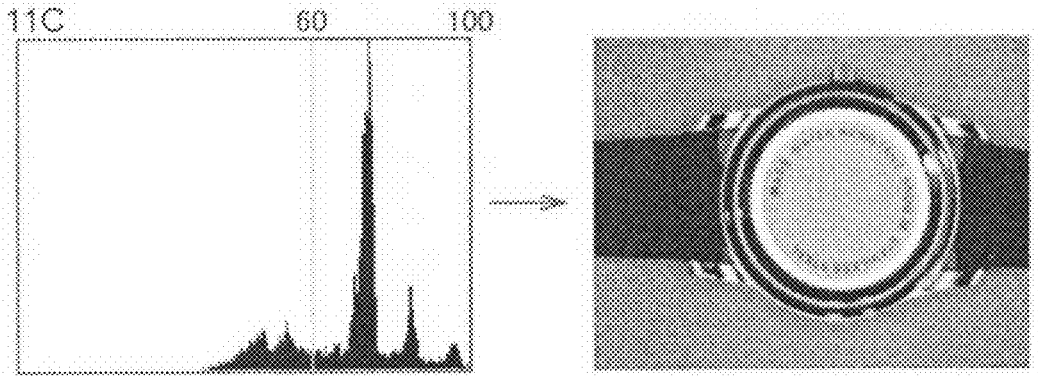

Meanwhile, as shown in FIG. 11B, when the range of the pixel mainly corresponding to the band part made of leather is set in a range shown by the "brightness" upper/lower limits values, it is found that although the band part made of leather is clearly photographed, the overexposure occurs in the watch body part made of metal. Reversely, as shown in FIG. 11C, when the range of the pixels mainly corresponding to the watch body part made of metal is set in a range shown by the "brightness" upper/lower limits values, it is found that although the watch body part made of metal is clearly photographed, underexposure occurs in the band part made of leather.

Figure 11D:
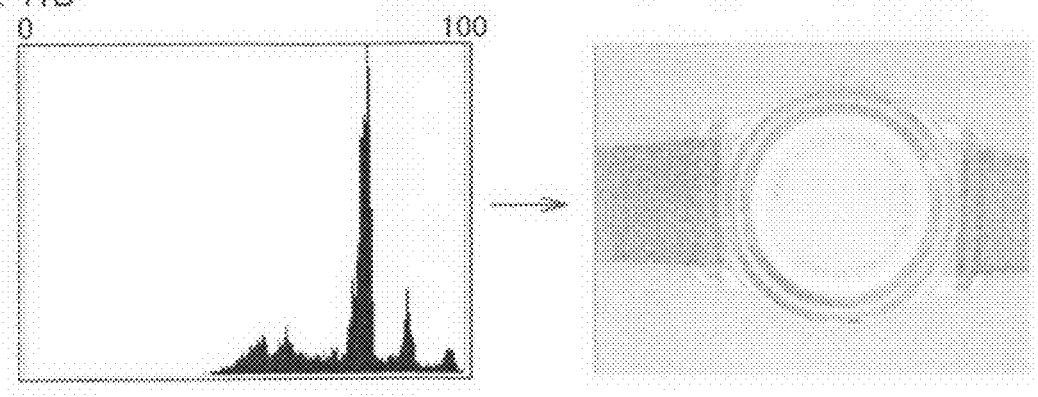

In addition, as shown in FIG. 11D, when the whole range of the histogram is set in a range shown by the "brightness" upper/lower limits values, it is found that although the whole part of the image is clearly photographed, contrast is deteriorated if compared to FIG. 11A.

Thus, by adjusting a proper "brightness" upper/lower limits values according to a target workpiece, the user can generate the output image data suitable for the inspection or measurement.

<Calculation of the Processing Time>

As described above, the processing time calculation part 222 (FIG. 4) calculates the expected processing time required for generating one output image data, and the calculated processing time is displayed in the photographing information display area 340 as "photographing time". In the description hereunder, by using FIG. 12, an example of the calculation method of the processing time by this processing time calculation part 222 will be explained.

Figure 12A:
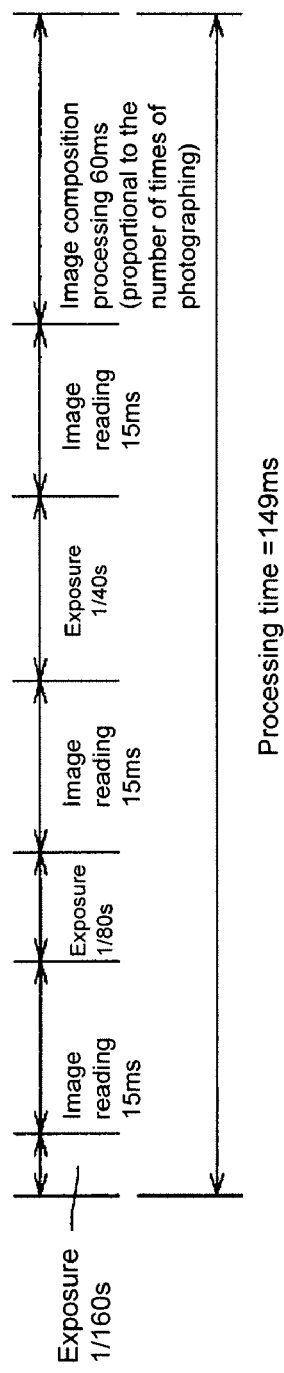
FIGS. 12A and 12B show views for explaining an example of a calculation method of a processing time in the image processing apparatus according to the embodiment 1 of the present invention.
Figure 12B:
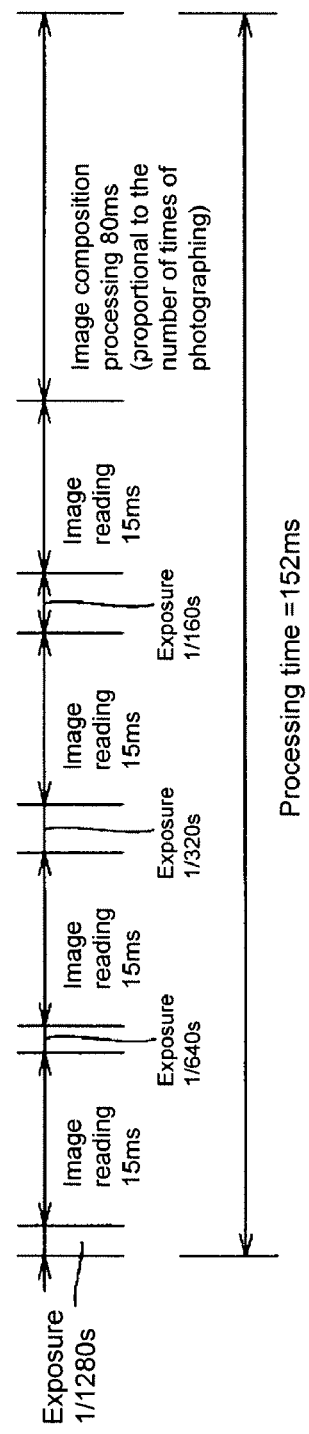

FIGS. 12A and 12B shows a view for explaining an example of the calculation method of the processing time in the image processing apparatus according to the embodiment 1 of the present invention.

In FIG. 12A, for example, when the exposure time is changed to "1/40 seconds", "1/80 seconds", and "1/160 seconds" and photographing is performed three times, the processing time can be calculated by sum of the time required for this photographing (exposure time), the time required for reading the input image data photographed by the image pickup apparatus 8, and the time required for the image composition processing.

In addition, in FIG. 12B, for example when the exposure time is changed to "1/160 seconds", "1/320 seconds", "1/640 seconds", and "1/1280 seconds", and the photographing is performed four times, the sum of the exposure time is shortened, but an input image data amount, being an object of the image composition processing, is increased. Therefore, the processing time as a whole is extended.

Here, the time required for the photographing can be estimated from the set exposure time. In addition, the time required for reading the input image data is approximately a constant value depending on a specification of the hardware, and can be previously acquired. Also, the time required for the image composition processing can also be estimated, because processing amount is defined by the number of input images to be processed.

Accordingly, the processing time calculation part 222 can calculate the expected processing time required for generating the output image data, based on the exposure conditions and the number of times of photographing. In addition, every time the "brightness" upper/lower limits values are changed, it is possible to calculate the processing and update the display.

<Display Accuracy of the Composite Image>

As described above, in the display mode selection area 350 (FIG. 8, FIG. 9), there is provided the radio button 352 for selecting the display accuracy of the composite image displayed in the composite image display area 330. When the user selects "high precision" by this radio button 352, the color composition part 208, the luminance composition part 210, the tone mapping part 214, and the image generation part 212, and the like, apply processing to all pixels included in the input image.

Meanwhile, when the user selects "simple" by the radio button 352, the color composition part 208, the luminance composition part 210, the tone mapping part 214, and the image generation part 212, and the like, divide the input screen into a plurality of areas including a plurality of pixels, and apply processing only to one pixel representing this area in each area. Namely, 4×4 pixel is regarded as one area (block), and based on the composite luminance and composite color information obtained from one pixel (for example, pixel positioned in the upper left of each block), the composite image of this block is generated. By this processing, the processing amount of the image composition processing can be reduced.

Figure 13A:
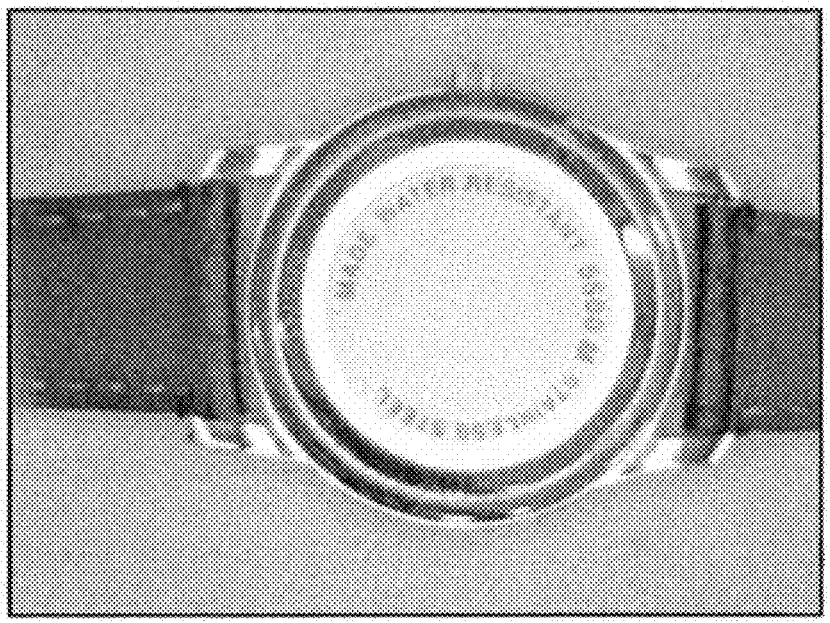
FIGS. 13A and 13B show views illustrating a display example of the composite image in the image processing apparatus according to the embodiment 1 of the present invention.
Figure 13B:
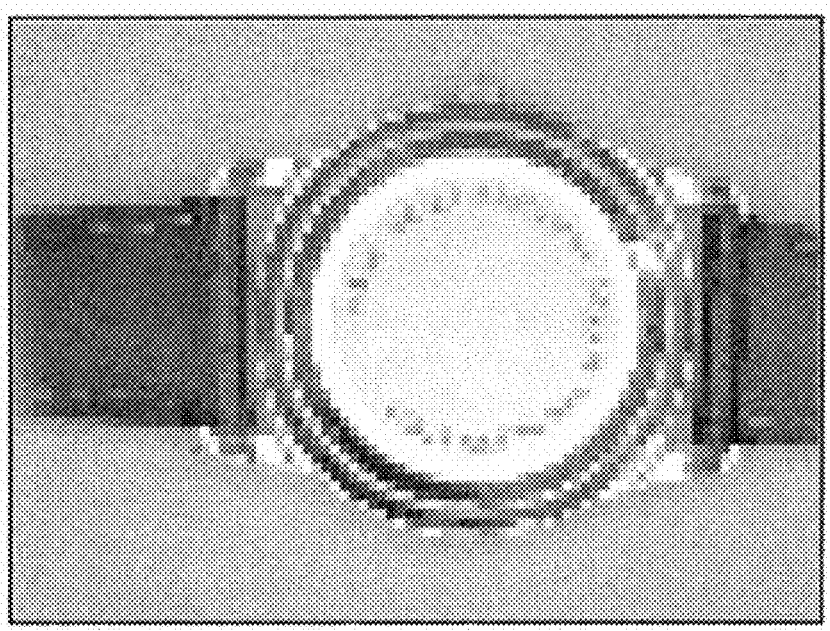

FIGS. 13A and 13B show a view illustrating the display example of the composite image in the image processing apparatus according to the embodiment 1 of the present invention. FIG. 13A shows a case of being set to "high precision", and FIG. 13B shows a case of being set to "simple".

As shown in FIG. 13A, in a case of being set to "high precision", the composite image is displayed with the same precision as that of the input image. Meanwhile, as shown in FIG. 13B, in a case of being set to "simple", the composite image formed into blocks is displayed, and compared to the case of FIG. 13A, it is found that the updating cycle becomes faster, and a degree of precision is deteriorated.

<Operation Mode>

An example of the processing in the operation mode will be explained hereunder. Conventionally, there are proposed various methods of performing inspection or measurement of the workpiece by using the generated output image data. However, this embodiment exemplifies search processing of searching a part that coincides with a previously registered image pattern, and edge scan processing of detecting edges of the workpiece and measuring a distance between the edges. Note that the processing in the operation mode is not limited to these processing.

Figure 14:
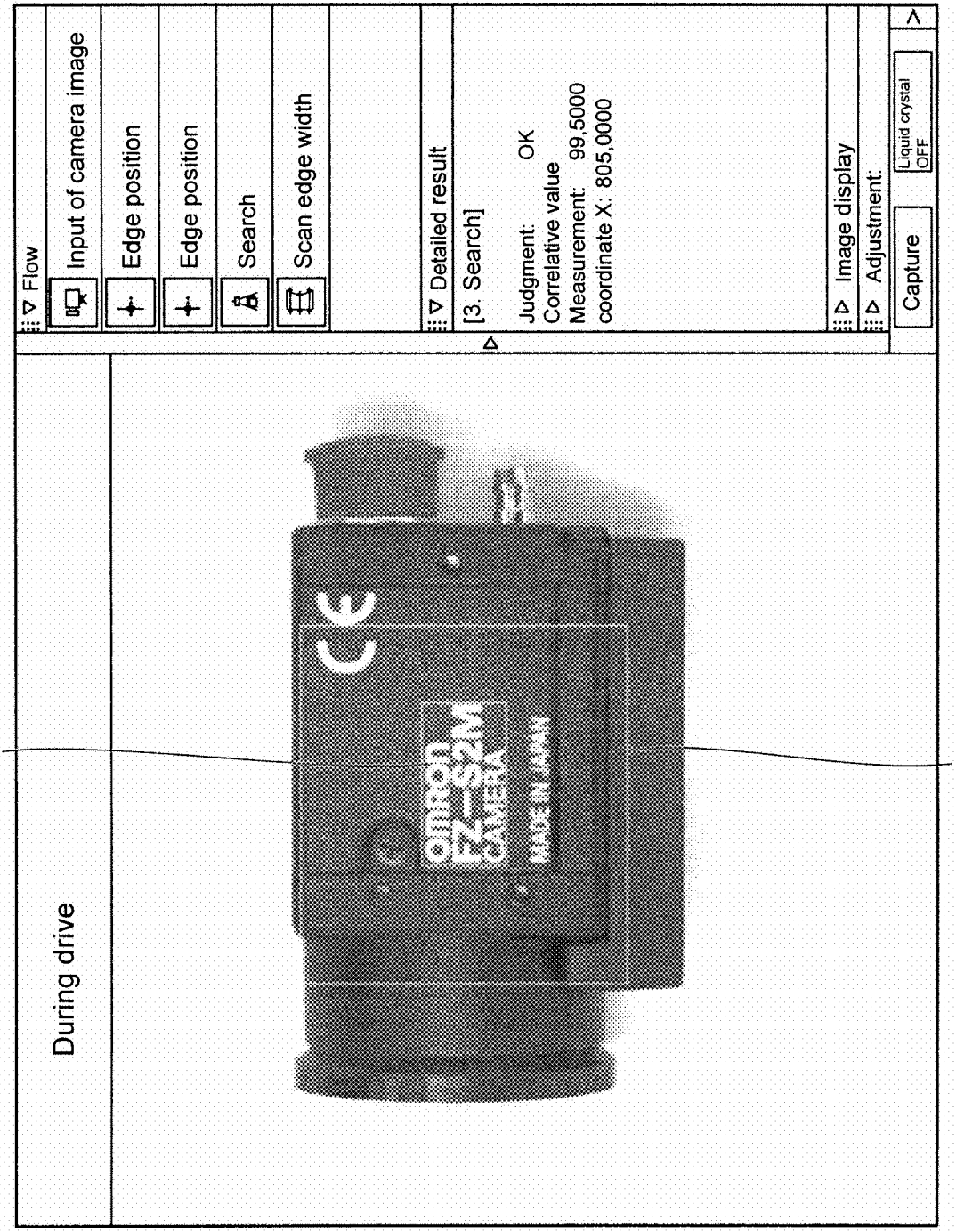
FIG. 14 shows a view illustrating the display example of a search processing, being an example of an operation mode.

FIG. 14 shows a view illustrating the display example of the search processing, being an example of the operation mode.

Figure 15:
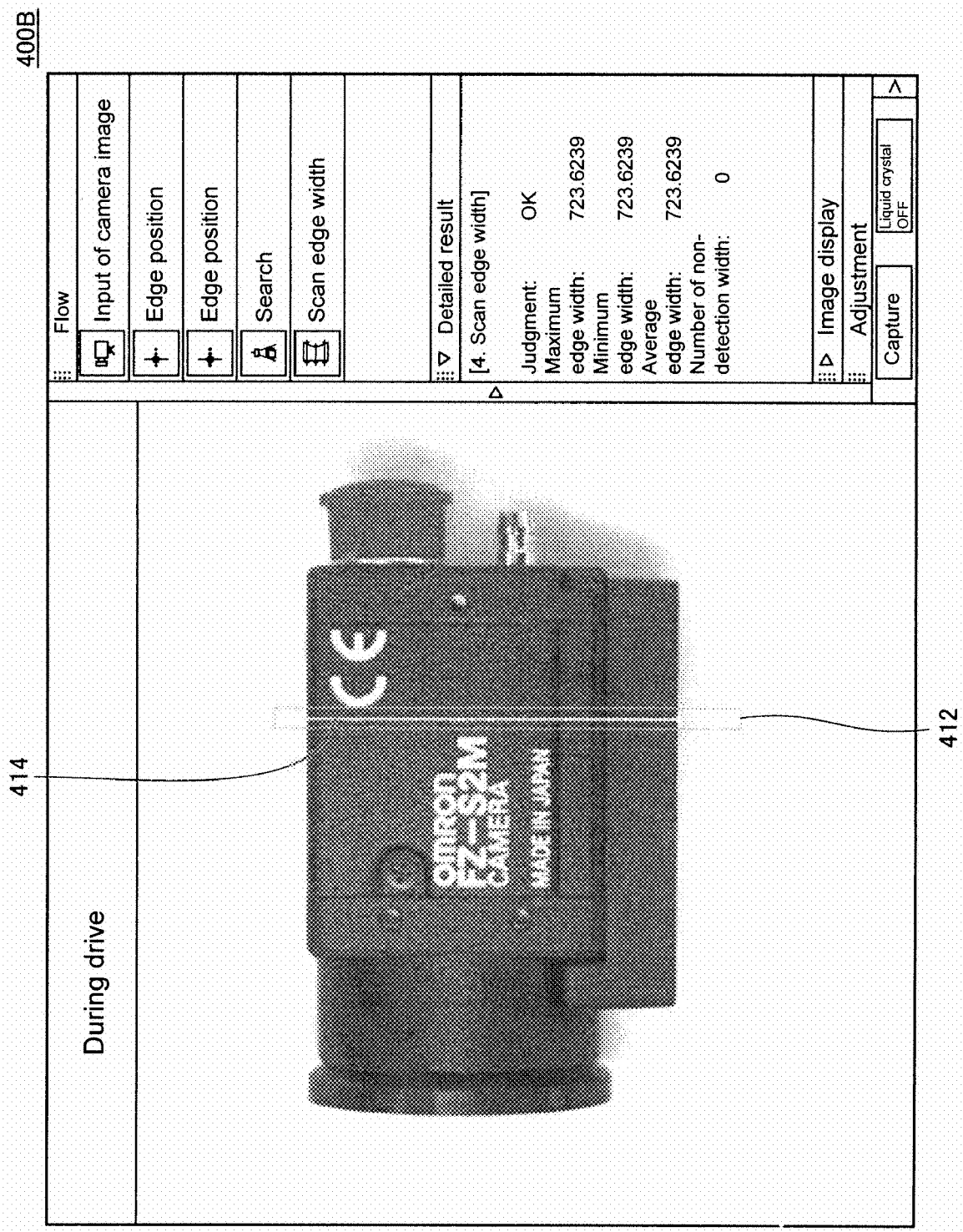
FIG. 15 shows a view illustrating the display example of an edge scan processing, being an example of the operation mode.

FIG. 15 shows a view illustrating the display example of the edge scan processing, being an example of the operation mode.

In FIG. 14, when the search processing is selected in the "operation mode", an operation mode screen 400A is displayed in the monitor 102. In this operation mode screen 400A, the user previously sets a target region 402, and registers the image pattern to be detected. Then, by sequentially calculating a correlation value between the output image data and the registered pattern by applying the aforementioned image composition processing to the target region 402, the CPU 105 specifies an area 404 that coincides with the registered pattern. Further, the CPU 105 displays positional information, etc, of the specified area 404, in the monitor 102.

Note that the information of the target region 402 set by the user is inputted into the composition accuracy estimation part 220 shown in FIG. 4, and the composition accuracy estimation part 220 determines the composition accuracy (reliability) of this target region 402.

According to this search processing, when a specific kind of workpiece is sequentially produced, a different kind of mixed workpiece can be detected.

In FIG. 15, when the edge scan processing is selected in the "operation mode", an operation mode screen 400B is displayed on the monitor 102. In this operation mode screen 400B, the user previously sets a target region 412. Then, in the output image data, the CPU 105 applies the aforementioned image composition processing and specifies two places (edge positions) in which chrominance is a prescribed value or more, in the target region 412. Then, the CPU 105 defines a straight line 414 connecting these specified two points, and calculates a distance (such as a pixel value) between these two points on the figure.

Note that the information of the target region 412 set by the user is inputted into the composition accuracy estimation part 220 shown in FIG. 4, and the composition accuracy estimation part 220 determines the composition accuracy (reliability) of this target region 412.

According to such an edge scan processing, by comparing an inter-edge distance and a defined value, a production failure of the workpiece, etc, can be detected.

In addition to the aforementioned processing, it is also possible to perform color area calculation processing of counting the number of pixels having a specific color range.

<Processing Procedure>

Figure 16:
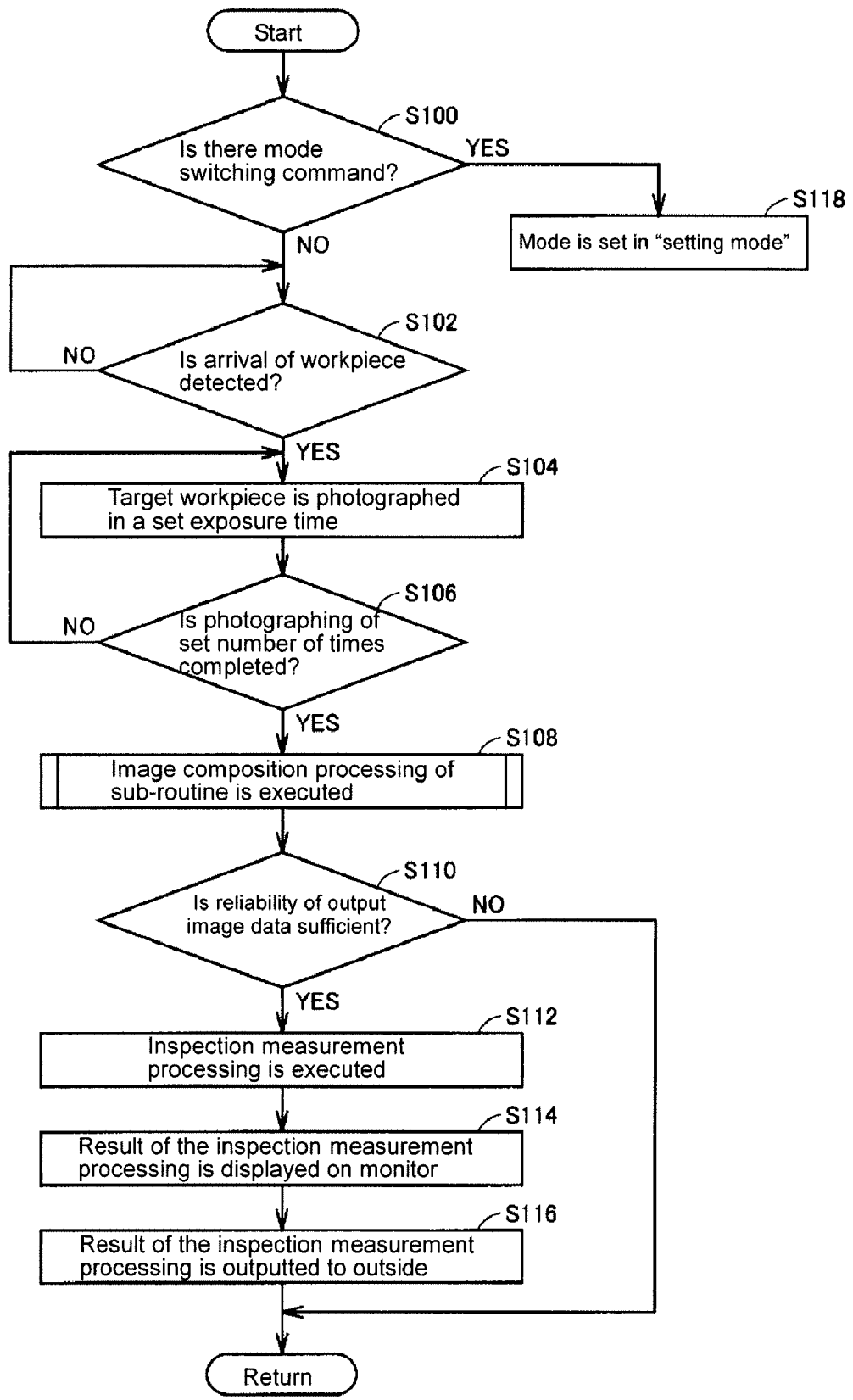
FIG. 16 is a flowchart illustrating an overall processing in the image processing apparatus according to the embodiment 1 of the present invention.

FIG. 16 is a flowchart illustrating overall processing in the image processing apparatus according to the embodiment 1 of the present invention. The flowchart shown in FIG. 16 is realized by reading the program previously stored in the fixed disk 107, etc, into the memory 106 and executing this program by the CPU 105. Note that an initial mode is set in the "operation mode".

In FIG. 16, the CPU 105 determines whether or not a mode switching command is given (step S100). When the mode switching command is not given (case of NO in step S100), the CPU 105 executes inspection measurement processing from step S102 to step S116.

Namely, the CPU 105 determines whether or not the arrival of the workpiece 2 is detected by the photoelectric sensor (step S102). When the workpiece 2 does not arrive (case of NO in step S102), the processing of step S102 is repeated.

When the workpiece 2 arrives (case of YES in step S102), the CPU 105 photographs the workpiece 2 in the set exposure time, in accordance with the setting in which the program is previously stored in the fixed disk 107 (step S104). Then, the CPU 105 determines whether or not the photographing of set number of times is completed (step S106). When the photographing of set number of times is not completed (case of NO in step S106), the CPU 105 repeats the processing of step S104.

When the photographing of set number of times is completed (case of YES in step S106), the CPU 105 executes image composition processing sub-routine, and generates the output image data from the photographed input image data (step S108). Further, the CPU 105 calculates the composition accuracy for this output image data, and determines whether or not the reliability of the output image data is sufficient (step S110). When the reliability of the output image data is not sufficient (case of NO in step S110), a message of insufficient reliability is displayed on the monitor 102, and the processing thereafter is not performed.

When the reliability of the output image data is sufficient (case of YES in step S110), the CPU 105 executes the inspection measurement processing based on the generated output image data (step S112). Then, the CPU 105 displays a result of this inspection measurement processing on the monitor 102, etc (step S114), and outputs the result of this inspection measurement processing to an external device such as a PLC (step S116). Then, the processing is returned to first.

Meanwhile, when the mode switching command is given (case of YES in step S100), the mode of the CPU 105 is moved to a "setting mode" (step S118).

Figure 17:
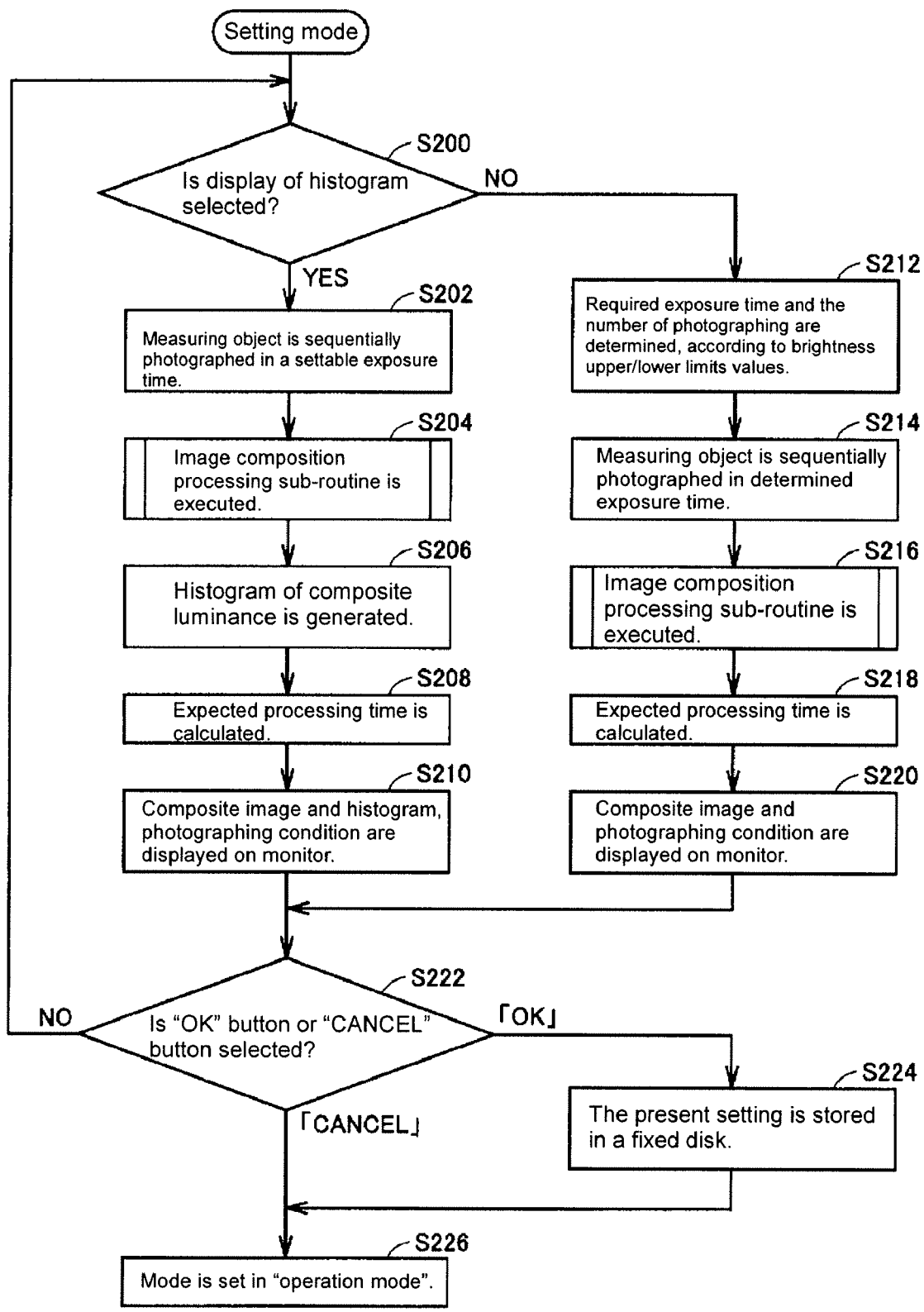
FIG. 17 is a flowchart illustrating the processing in the "setting mode" in the image processing apparatus according to the embodiment 1 of the present invention.

FIG. 17 shows a flowchart illustrating the processing in the "setting mode" in the image processing apparatus according to the embodiment 1 of the present invention. The flowchart shown in FIG. 17 is realized by reading the program previously stored in the fixed disk 107, etc, into the memory 106 and executing this program by the CPU 105.

In FIG. 17, the CPU 105 determines whether or not the display of the histogram is selected in the setting mode screen 300 (step S200).

When the display of the histogram is selected (case of YES in step S200), the CPU 105 sequentially performs photographing in the exposure time settable in the image pickup apparatus 8 (step S202). Then, the CPU 105 executes the image composition processing sub-routine, and generates the output image data from the photographed input image data (step S204). At this time, the CPU 105 generates the output image data, according to the "brightness" upper/lower limits values inputted by the user. Simultaneously, the CPU 105 generates the histogram of the composite luminance (step S206), and calculates the expected processing time required for generating one output image data (step S208). Then, the CPU 105 displays on the monitor 102, the composite image based on the output image data, the histogram of the composite luminance, and the photographing conditions such as the processing time and the number of times of photographing (step S210).

Meanwhile, when the non-display of the histogram is not selected (case of NO in step S200), the CPU 105 determines required exposure time and the number of photographs, according to the "brightness" upper/lower limits values inputted by the user (step S212). Then, the CPU 105 sequentially performs photographing in the determined exposure time (step S214). Further, the CPU 105 executes the image composition processing sub-routine, and generates the output image data from the photographed input image data (step S216). In addition, the CPU 105 calculates the expected processing time required for generating one output image data (step S218). Then, the CPU 105 displays on the monitor 102, the composite image based on the output image data, and the photographing conditions such as the processing time and the number of times of photographing (step S220).

Further, the CPU 105 determines whether or not the "OK" button 362 or the "CANCEL" button 364 of the setting mode screen 300 is selected (step S222). When the "OK" button 362 is selected ("OK" in step S222), the CPU 105 stores the present setting into the fixed disk 107 (step S224). Then, the mode of the CPU 105 is moved to the "operation mode" (step S226). In addition, when the "CANCEL;" button 364 is selected ("CANCEL" in step S212), the CPU 105 discards the present setting and the mode is set in the "operation mode" (step S226).

Meanwhile, when both of the "OK" button 362 and the "CANCEL" button 364 of the setting mode screen 300 are not selected (case of NO in step S222), the CPU 105 returns the processing to the first processing.

Figure 18:
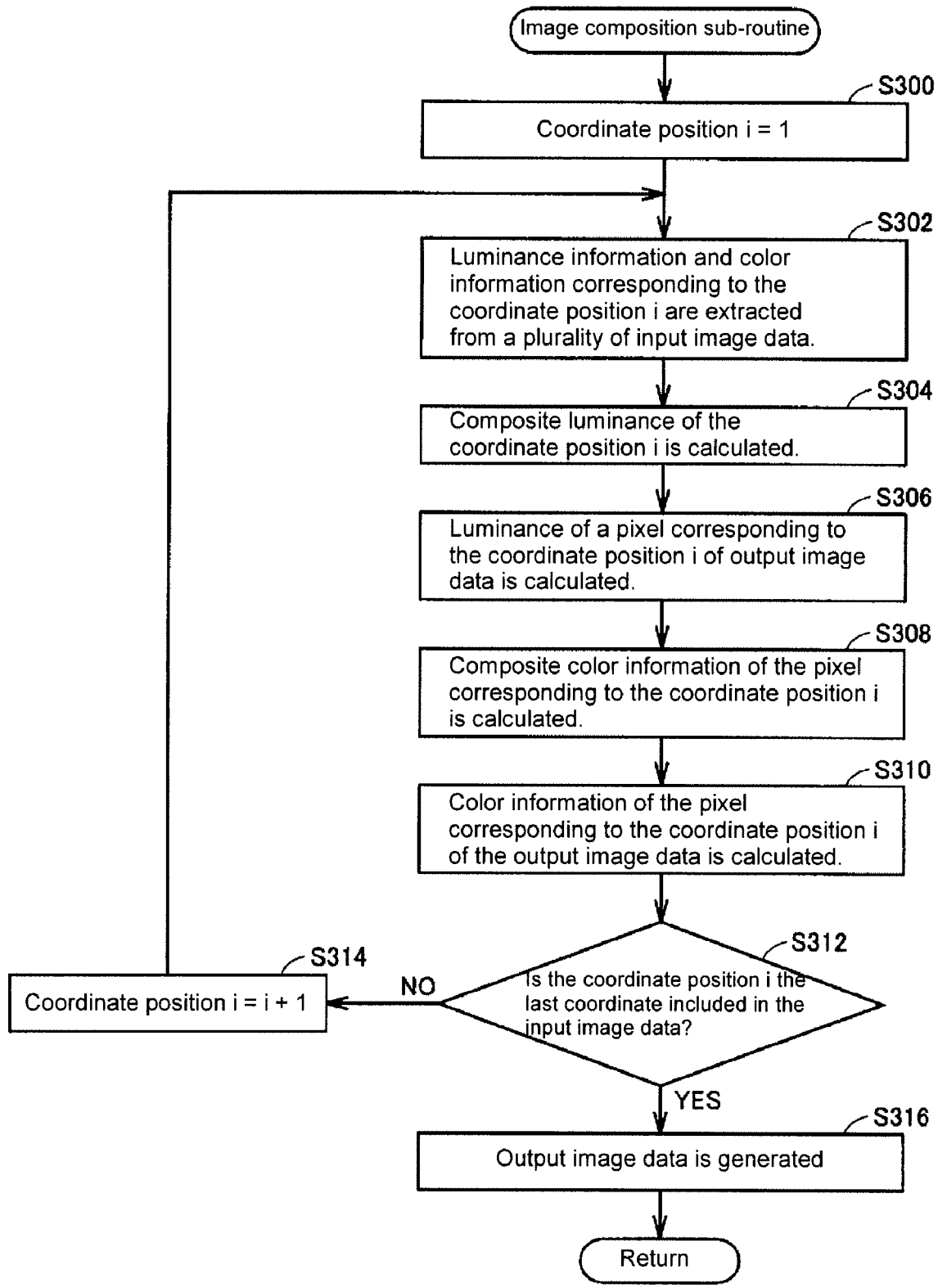
FIG. 18 is a flowchart illustrating the processing in an image composition processing sub-routine shown in FIG. 16 and FIG. 17.

FIG. 18 is a flowchart illustrating the processing in the image composition processing sub-routine shown in FIG. 16 and FIG. 17. The flowchart shown in FIG. 18 is realized by reading the program previously stored in the fixed disk 107, etc, into the memory 106 and executing this program by the CPU 105.

In FIG. 18, the CPU 105 sets a coordinate position i to be an initial value (i=1) (step S300), and extracts the luminance information and the color information of the pixel corresponding to the coordinate position i, from a plurality of input image data (step S302).

Based on the luminance of the pixel corresponding to the coordinate position i, the CPU 105 calculates the composite luminance of the coordinate position (step S304). Then, the CPU 105 performs tone mapping in accordance with set "brightness" upper/lower limits values, and calculates the luminance of the pixel corresponding to the coordinate position i of the output image data (step S306).

In addition, based on the color information of the pixel corresponding to the coordinate position i, the CPU 105 calculates the composite color information of the pixel corresponding to the coordinate position i (step S308).

Further, based on the luminance calculated in step S306, and the composite color information calculated in step S308, the CPU 105 calculates the color information of the pixel corresponding to the coordinate position i of the output image data (step S310).

Then, the CPU 105 determines whether or not the coordinate position i is a last coordinate included in the input image data (step S312). When the coordinate position i is not the last coordinate included in the input image data (case of NO in step S312), the CPU 105 adds "1" to the present coordinate position i (step S314), and the processing after step S302 is repeated. When the coordinate position i is the last coordinate included in the input image data (case of YES in step S312), the CPU 105 generates the output image data, based on the color information corresponding to each coordinate position calculated in step S310 (step S316). Then, the processing is returned to a main routine.

Note that instead of the display of the "photographing time", namely, the display of the expected processing time required for generating the composite image data from the plurality of times of photographing, it is also possible to display the expected processing time required from the plurality of times of photographing up to generation of the composite image data, and the time of a single measurement cycle including the time required for the image processing such as inspection and measurement executed upon the operation mode to the generated composite image.

Modified Example 1

The above-described embodiment 1 exemplifies a structure in which an exposure time group is set to be sequentially faster by a power of 2, with "1/10 seconds" as a reference (slowest value). However, the accuracy of the generated output image data is affected by a change width of this exposure time group (power of 2 in this case), and the length of the processing time is affected thereby. It is preferable to set the change width of this exposure time group further greater or further smaller in some cases, depending on the workpiece. Therefore, the change width of this exposure time group may be made changeable by the user.

Figure 19:
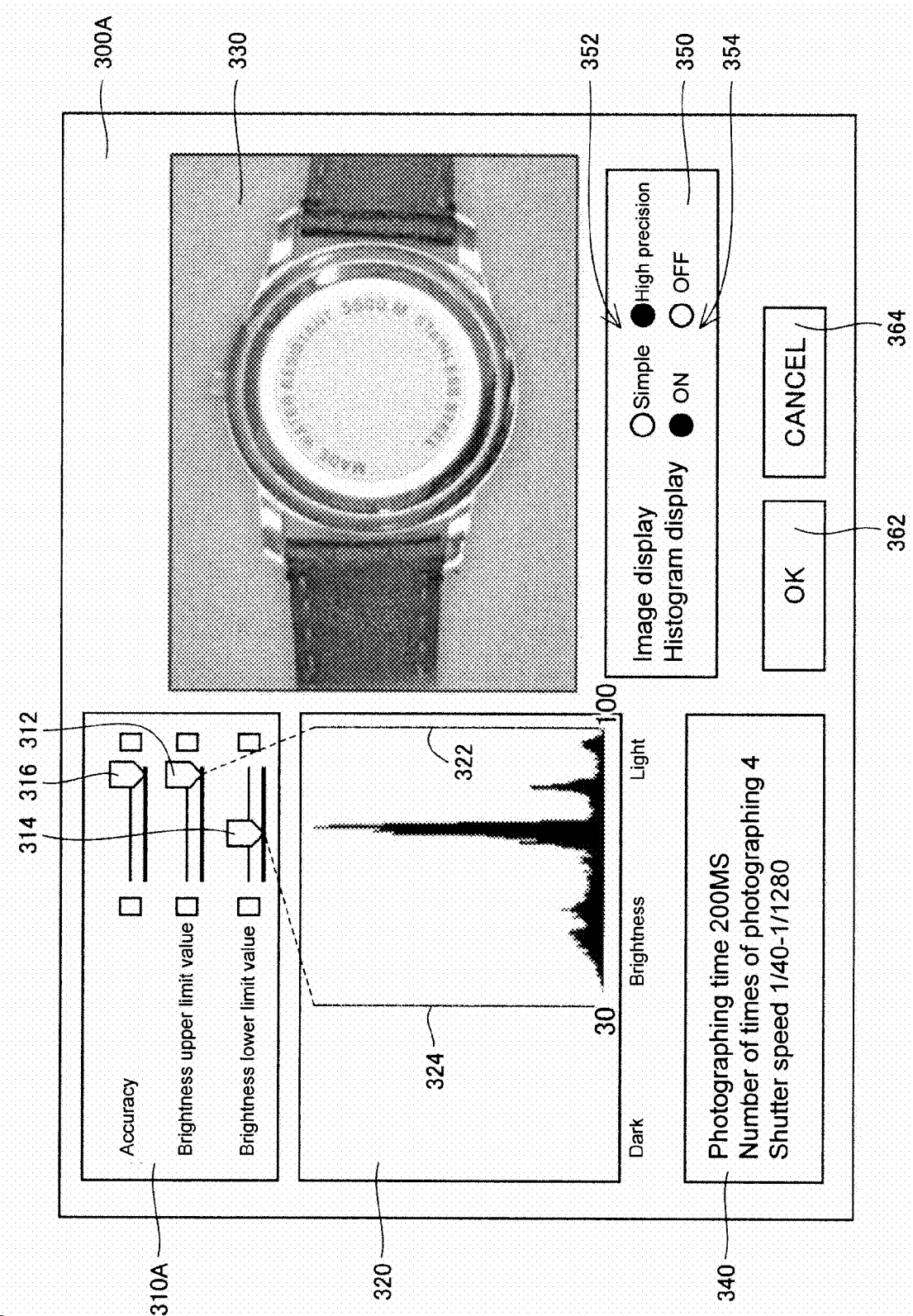
FIG. 19 shows a view illustrating the screen display example in the "setting mode" displayed on the monitor of the image processing apparatus according to the modified example 1 of the embodiment 1 of the present invention.

FIG. 19 shows a view illustrating a screen display example in the "setting mode" displayed on the monitor of the image processing apparatus according to a modified example 1 of the embodiment 1 of the present invention.

In FIG. 19, the setting mode screen 300A disposes a "brightness" upper/lower limits input area 310A in the setting mode screen 300 shown in FIG. 8, instead of the "brightness" upper/lower limits input area 310, and the other parts are the same as that of the setting mode screen 300 shown in FIG. 8.

A slide bar 316 for setting the accuracy of the output image data is disposed in the "brightness" upper/lower limits input area 310A. The accuracy set by the operation of this slide bar 316 is inputted into the photographing control part 200 (FIG. 4). The photographing control part 200 changes the combination of the exposure times set in the image pickup apparatus 8, according to the set value of this accuracy. For example, the photographing control part 200 reduces the exposure times set in the image pickup apparatus 8, to four cases such as "1/10 seconds", "1/40 seconds", "1/160 seconds", and "1/640 seconds". Thus, although the accuracy of the output image data is deteriorated, the processing speed is improved by about twice as a whole.

Modified Example 2

In the above-described embodiment 1, there is provided a structure as an example, in which the display or non-display of the histogram in the histogram display area 320 can be selected. However, as a method of shortening the processing time and making the update cycle faster, an execution cycle of the generation processing of the histogram having large quantity of information to be processed may be made longer than the execution cycle of the image composition processing. Namely, the operation of changing the "brightness" upper/lower limits setting by the user while referring to the displayed histogram, is relatively slow, and therefore it is not necessary to execute the generation processing of the histogram in the same way as the generation cycle of the composite image.

Therefore, by constantly performing the operation of the control structure as shown in FIG. 10 and also by performing the operation of the control structure as shown in FIG. 4 at a timing of updating the histogram, the update cycle of the composite image can be shortened, and the composite image can be displayed substantially like a moving image, and also the histogram of the composite luminance can be simultaneously displayed.

<Action Effect of this Embodiment>

According to the embodiment 1 of the present invention, when the "setting mode" is selected, descriptions such as "composite image based on the generated output image data" and "the expected processing time required for generating the output image data" are displayed in parallel. Therefore, the user can easily set a proper photographing condition, in consideration of a balance between the quality of an actually generated composite image and the processing time allowable at an actual production site. Accordingly, even in a case of resetting the lighting condition and the photographing condition like a case in which the kind of the generated workpiece is changed, prompt action can be taken to this case. In addition, this photographing condition can be easily set even by a user who has no expert knowledge.

Further, according to the embodiment 1 of the present invention, by selecting the display/non-display of the histogram displayed on the setting mode screen 300 by the user, the generation processing of the histogram having relatively large quantity of processing amount can be suspended or restarted. Thus, the update cycle of the composite image displayed on the setting mode screen 300 can be made faster, and the display substantially like a moving image can be realized. As a result, the user can know this adjustment result in approximately real time, when a set place and the lighting condition, etc, are determined, and therefore setup can be speedily performed without stress.

Further, according to the embodiment 1 of the present invention, the composition accuracy (reliability) of the generated output image data is determined as needed in the operation mode. Therefore, when the workpiece is moved during photographing, then the lighting condition is changed, and the reliability of the generated output image data is deteriorated, this output image data is not used in the inspection or measurement. As a result, it is possible to obviate improper results of the inspection or measurement.

Embodiment 2

The above-described embodiment exemplifies a form of executing the image composition processing, in accordance with a "brightness" range arbitrarily set by the user. According to this form, there is a merit that the output image data focusing on the necessary "brightness" range can be generated. However, from the viewpoint of the user who has no background knowledge, it is preferable to generate a proper output image data, with further simple operation. Therefore, this embodiment exemplifies the image processing apparatus that can be set properly even by the user who has no background knowledge.

<Screen Display Example>

Figure 20:
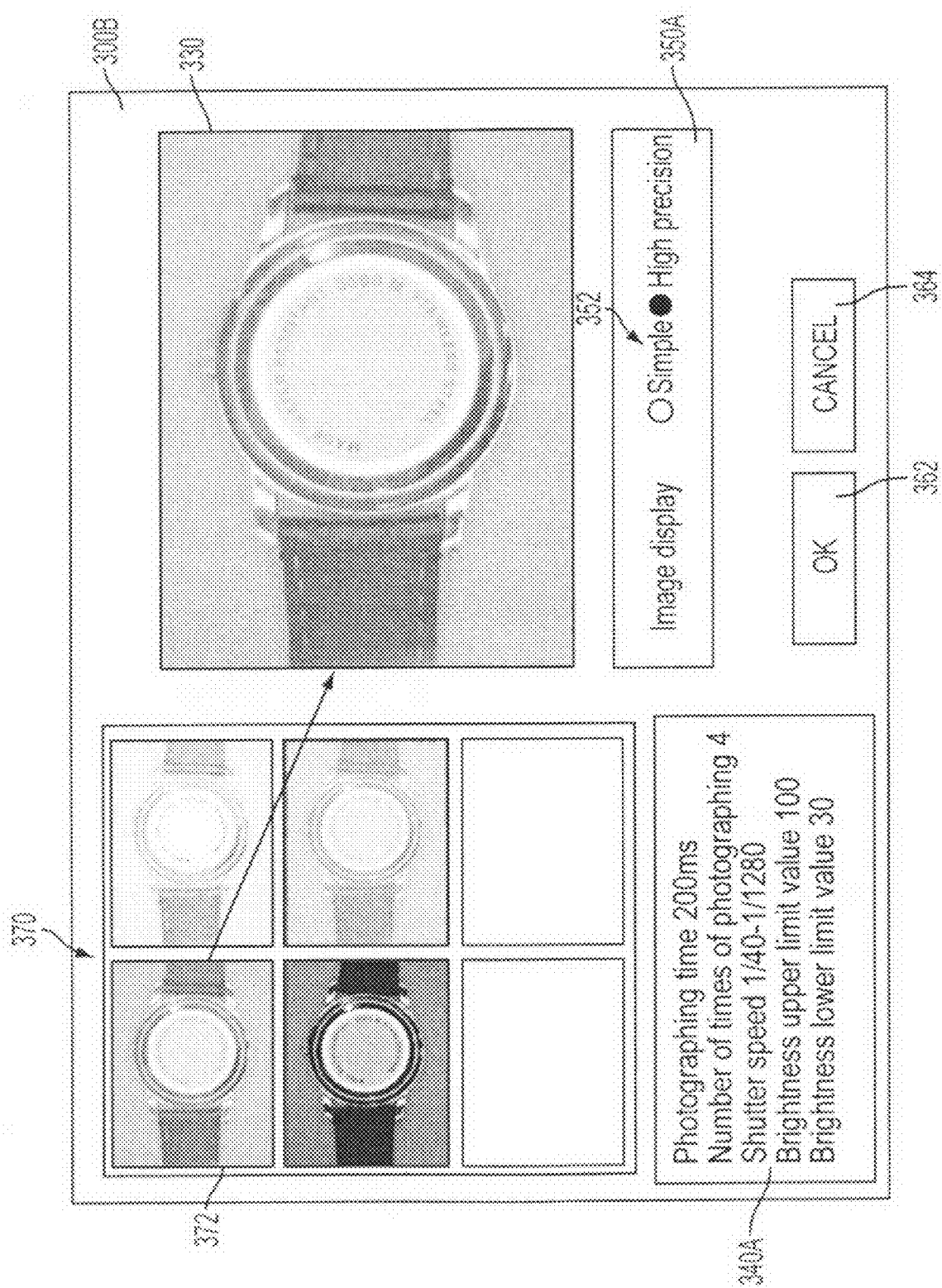
FIG. 20 shows a view illustrating the screen display example in the "setting mode" displayed on the monitor of the image processing apparatus according to an embodiment 2 of the present invention.

FIG. 20 shows a view illustrating a screen display example in the "setting mode" displayed on the monitor of the image processing apparatus according to the embodiment 2 of the present invention.

A setting mode screen 300B includes a reduced image display area 370, the composite image display area 330, a photographing information display area 340A, and a display mode selection area 350A.

As will be described later, the reduced image display area 370 displays at least one reduced composite image (thumbnail image) based on at least one reduced composite image data generated in accordance with a different setting. Namely, this reduced composite image is generated by performing the image composition processing, with the "brightness" upper/lower limits values set in a different range, and by using a cursor 372 on the screen operated by a keyboard 103 or a mouse 104, the user selects the image determined to be most suitable. Then, the composite image corresponding to the selected reduced composite image is displayed in the composite image display area 330. Note that the composite image data is generated with higher resolution than that of the reduced composite image data. Namely, the reduced composite image data is generated by using a part of the pixels of the input image data photographed by the image pickup apparatus 8, to shorten the processing time.

Thus, by displaying in the same setting mode screen 300B, a plurality of reduced composite images respectively obtained from a plurality of images photographed under at least one different exposure condition, and the composite image (non-reduced composite image) corresponding to the selected reduced composite image, proper setting can be performed even by the user who has no background knowledge.

The photographing information display area 340A displays the "photographing time", "the number of times of photographing", "shutter speed", "brightness upper limit value", and "brightness lower limit value". In the image processing apparatus according to this embodiment, the user can complete the setting in such a way that the user is not conscious of the range of the specific "brightness" upper/lower limits values. Therefore, "brightness upper limit value" and "brightness lower limit value" are displayed as the photographing information.

Note that in the image processing apparatus according to this embodiment, the user does not set the "brightness" upper/lower limits values, and therefore hysteresis may not be displayed. Therefore, in a standard setting mode screen 300B, the hysteresis is not displayed, and accordingly, the display mode selection area 350A omits the display of the radio button 354 for selecting the display/non-display of the histogram.

<Control Structure>

Figure 21:
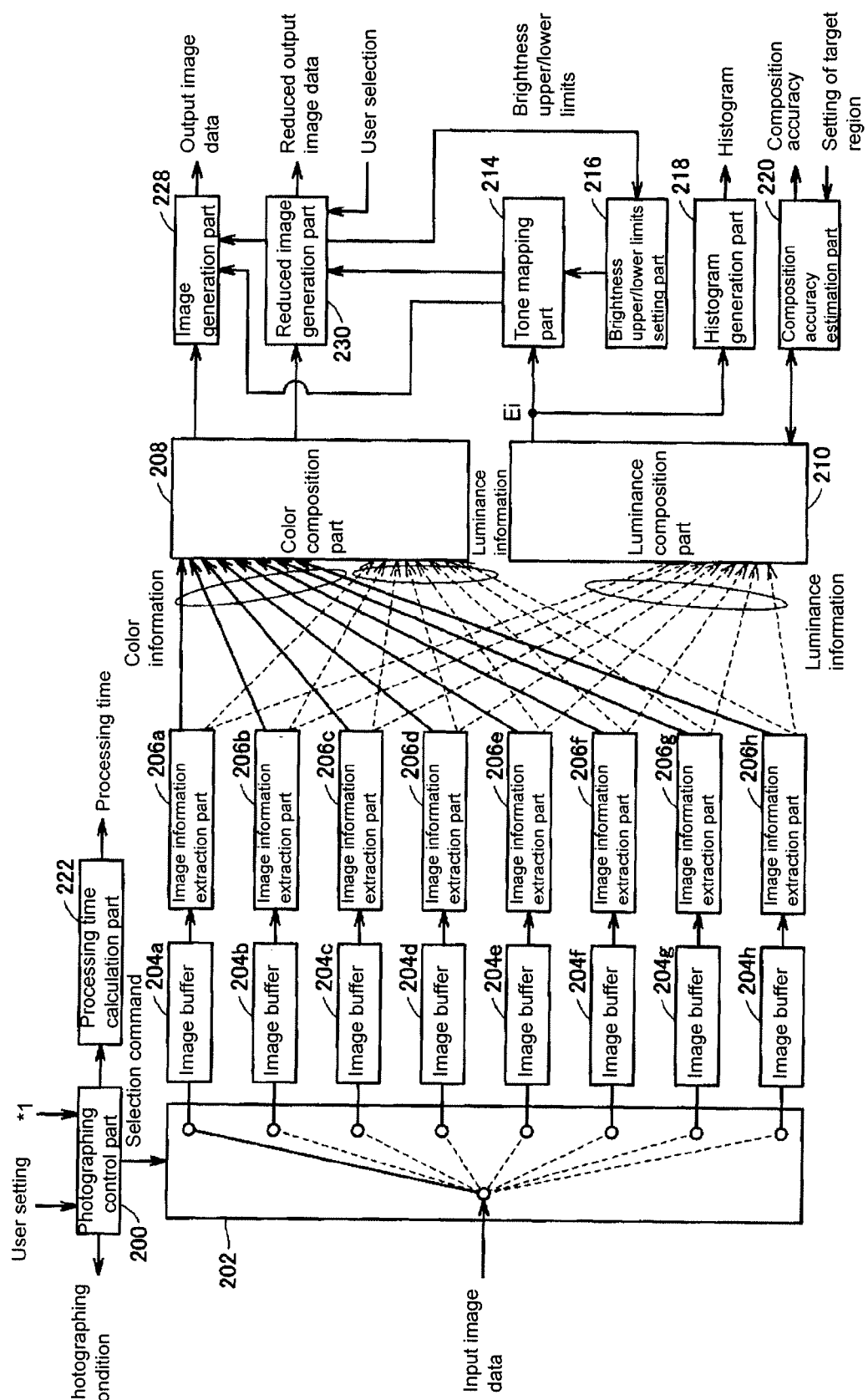
FIG. 21 shows a functional block diagram illustrating the control structure of the image processing apparatus according to the embodiment 2 of the present invention.

FIG. 21 shows a functional block diagram illustrating a control structure of the image processing apparatus according to an embodiment 2 of the present invention.

In FIG. 21, the image processing apparatus according to this embodiment corresponds to the one including an image generation part 228 and a reduced image generation part 230, instead of the image generation part 212, in the control structure shown in FIG. 4. Note that the other parts are the same as that of FIG. 4, and therefore detailed explanation thereof is not repeated.

The reduced image generation part 230 generates at least one reduced composite image data, based on at least one set of color information and luminance information including the image data of prescribed numbers out of a plurality of input image data. More specifically, the reduced image generation part 230 determines necessary input image data in accordance with a set value of the previously set "brightness" range ("brightness" upper limit value and "brightness" lower limit value), and generates the reduced composite image data based on the color information and the luminance information of the determined input image data. Note that the necessary input image data is determined by the set value in the "brightness" range, and by referring to the relation shown in FIG. 5. For example, the reduced image generation part 230 generates the reduced composite image data corresponding to the "brightness" range such as "30 to 60", "30 to 80", "50 to 80" . . . , respectively. Then, a reduced image based on the reduced composite image data is displayed on the reduced image display area 370 of the setting mode screen 300B. Note that the reduced composite image can also be generated by a publicly-known method such as a decimation processing.

Note that the luminance of the output image data is outputted from the tone mapping part 214 in accordance with the "brightness" upper/lower limits values. Therefore, the reduced image generation part 230 outputs the "brightness" range corresponding to the reduced composite image data in the middle of generation, to the "brightness" upper/lower limits setting part 216 as needed. In addition, the reduced image generation part 230 generates the reduced composite image data, by using a part of the pixels of the input image data.

Further, the photographing control part 200 (FIG. 21) makes the image pickup apparatus 8 repeatedly execute photographing in all settable exposure times. Therefore, the input image data stored in the image buffer 204 is periodically updated.

The image generation part 228 generates the composite image corresponding to the reduced composite image data selected by the user in the setting mode screen 300B, out of the reduced composite image data generated by the reduced image generation part 230. The image generation part 228 generates the composite image data by using all pixels of the input image data, and therefore the resolution of the composite image data is higher than the resolution of the reduced composite image data.

Note that the processing in the image generation part 228 and the reduced image generation part 230 is the same as the processing in the aforementioned image generation part 212 (FIG. 4), and therefore detailed explanation thereof is not repeated.

<Action Effect of this Embodiment>

According to the embodiment 2 of the present invention, the same action effect as that of the embodiment 1 of the present invention can be obtained. In addition, the following action effect also exists.

According to the embodiment 2 of the present invention, when the "setting mode" is selected, a plurality of reduced composite images, with the "brightness" upper/lower limits values set to be different values, are displayed on the setting mode screen 300B, and also the composite image corresponding to one reduced composite image selected by the user is displayed. Therefore, only by selecting the composite image generated most suitably, the setting of the photographing condition is completed, in such a way that the user is not conscious of a technical meaning of the "brightness" upper/lower limits values. Thus, the photographing condition can be easily set by even the user who has no expert knowledge regarding the setting of the photographing condition.

In addition, when a plurality of composite images are displayed, the processing time is prolonged, and therefore there is a possibility that a real time performance of the image display is remarkably deteriorated. However, by using the reduced composite image, such an influence can be reduced.

Color images are targeted in the description of the above-described embodiments. However, it would be easily understood by a person skilled in the art, that the present invention is not limited to the color images, and can be applied to a simple gray level image, being a conventional technique. Namely, in the embodiments of the present invention, the image may be generated by the luminance composition part 210 alone, and the color composition part 208 may be omitted.

[Other Form]

The program according to the present invention may be so constituted that the processing is executed by calling a required module at a prescribed timing in a prescribed array pattern, out of the program modules provided as a part of an operating system (OS) of a computer. In this case also, the aforementioned module is not included in the program itself, and the processing is executed in cooperation with the OS. Such a program not including the module can also be included in the program according to the present invention.

In addition, the program according to the present invention may be provided by being incorporated in a part of other program. In this case also, the program itself does not include the module included in other program, and the processing is executed in cooperation with other program. Such a program incorporated in other program can also be included in the program according to the present invention.

A program product thus provided can be executed by being installed in a program storage part such as a hard disc. Note that the program product includes the program itself and a recording medium in which programs are stored.

Further, a part or the whole part of the function realized by the program according to the present invention may be constituted of a dedicated hardware.

The embodiments disclosed this time should be absolutely considered to be exemplification and should not be considered to be restrictive. The scope of the present invention is shown not by the above-described explanation but by the scope of the claims, and intended to include all modifications in the scope of the claims, and in the meaning and the scope equivalent to the scope of the claim.

What is claimed is:

1. An image processing apparatus, connected to an image pickup part and a display part, in which exposure conditions for photographing a measuring object can be changed,
   the image pickup part comprising an image pickup section constituted of an assembly of a plurality of pixels for photographing;
   the image processing apparatus comprising:
      a photographing controller that generates a plurality of image data by making the image pickup part photograph the measuring object under different exposure conditions a plurality of times;
      a compositing section that generates composite image data, based on color information and luminance information of the plurality of image data; and
      a display section that displays on the display part a composite image based on the composite image data,
   the compositing section comprising:
      a composite luminance calculator that calculates a distribution value corresponding to an intensity distribution of lights incident on an image pickup element of the image pickup section, as a composite luminance distribution of the composite image data, based on the luminance information of each image data and corresponding exposure condition; and
      an accuracy determination section that calculates a value corresponding to the distribution of the light intensity incident on the image pickup element of the image pickup section based on a luminance distribution in the plurality of image data corresponding to specific points, and determines reliability of the composite image data based on a degree of coincidence of this value of each image data
   wherein the accuracy deteimination section determines the reliability, based on a variation of converted values calculated by correcting each pixel in the plurality of image data under the corresponding exposure condition.

2. An image processing apparatus, connected to an image pickup part and a display part, in which exposure conditions for photographing a measuring object can be changed,
   the image pickup part comprising an image pickup section constituted of an assembly of a plurality of pixels for photographing;
   the image processing apparatus comprising:
      a photographing controller that generates a plurality of image data by making the image pickup part photograph the measuring object under different exposure conditions a plurality of times;
      a compositing section that generates composite image data, based on color information and luminance information of the plurality of image data;
      a display section that displays on the display part a composite image based on the composite image data; and
      a receiving section that receives setting of a target region out of a photographing range in the image pickup part, the compositing section comprising:
- a composite luminance calculator that calculates a distribution value corresponding to an intensity distribution of lights incident on an image pickup element of the image pickup section, as a composite luminance distribution of the composite image data, based on the luminance information of each image data and corresponding exposure condition; and
- an accuracy determination section that calculates a value corresponding to the distribution of the light intensity incident on the image pickup element of the image pickup section based on a luminance distribution in the plurality of image data corresponding to specific points, and determines reliability of the composite image data based on a degree of coincidence of this value of each image data, wherein the accuracy determination section determines the reliability, based on a variation in each specific point in the target region.

* * * * *